(12) United States Patent
May et al.

(10) Patent No.: US 12,277,102 B2
(45) Date of Patent: Apr. 15, 2025

(54) STREAM-BASED TRANSACTION PROCESSING

(71) Applicant: SAP SE, Walldorf (DE)

(72) Inventors: Norman May, Baden Wurttemberg (DE); Tiemo Bang, Bad Camberg (DE); Carsten Binnig, Baden Wurttembreg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/596,482

(22) Filed: Mar. 5, 2024

(65) Prior Publication Data

US 2024/0211460 A1  Jun. 27, 2024

Related U.S. Application Data

(63) Continuation of application No. 18/051,404, filed on Oct. 31, 2022, now Pat. No. 11,947,517.

(51) Int. Cl.
 *G06F 16/23* (2019.01)
 *G06F 9/54* (2006.01)
 *G06F 16/2455* (2019.01)
 *G06F 16/25* (2019.01)

(52) U.S. Cl.
 CPC .......... *G06F 16/2308* (2019.01); *G06F 9/546* (2013.01); *G06F 16/24568* (2019.01); *G06F 16/256* (2019.01)

(58) Field of Classification Search
 CPC . G06F 16/2908; G06F 16/2458; G06F 16/256
 See application file for complete search history.

(56) References Cited

U.S. PATENT DOCUMENTS

| | | | |
|---|---|---|---|
| 9,805,140 B2 * | 10/2017 | Chakrabarti | ............ H04L 47/83 |
| 10,846,321 B2 | 11/2020 | Xu et al. | |
| 2016/0203235 A1 * | 7/2016 | Chakrabarti | ............ H04L 47/83 |
| | | | 707/798 |
| 2022/0050827 A1 | 2/2022 | Ma et al. | |
| 2023/0205784 A1 | 6/2023 | Dusek | |

OTHER PUBLICATIONS

Vandevoort Brecht et al: "Robustness Against Read Committed A Free Transactional Lunch", Proceedings of The 41 ST ACM SIGMOD-SIGACT-SIGAI Symposium On Principles of Database Systems, ACMPUB27, New York, NY, USA, Jun. 12, 2022 (Jun. 12, 2022), pp. 1-14, XP059267 403, DOI: 10.1145/3517804.3524162 ISBN: 978-1-4503-9265-5.

Gokarna Sharma et al: "Transactional memory", SIGACT News, ACM, New York, NY, US, vol. 45, No. 2, Jun. 9, 2014 (Jun. 9, 2014), pp. 74-103, XP058055233, ISSN: 0163-5700, DOI: 10.1145/2636805.2636824.

(Continued)

*Primary Examiner* — Baoquoc N To
(74) *Attorney, Agent, or Firm* — Fountainhead Law Group, PC

(57) ABSTRACT

A stream of database transactions are received and conflicts between transaction types are determined. When a conflict is determined, job components forming a database architecture are configured to execute a first transaction, and in response to completing the first transaction, job components forming the database architecture are reconfigured to execute a second transaction.

20 Claims, 15 Drawing Sheets

(56) References Cited

OTHER PUBLICATIONS

Anonymous: "(PDF) AnyDB: An Architecture-less DBMS for Any Workload", , Sep. 30, 2020 (Sep. 30, 2020),XP093147471, Retrieved from the Internet: URL:https://www.researchgate.net/publication/344150186_AnyDB_An_Architecture-less_DBMS_for_Any_Workload.
The extended European search report is enclosed for the European Patent Application No. 23 180 817.1. Dated May 8, 2024, 9 pages.

* cited by examiner

STREAM-BASED TRANSACTION PROCESSING

CROSS REFERENCE TO RELATED APPLICATION

This application is a continuation of, and claims priority to, U.S. patent application Ser. No. 18/051,404, filed Oct. 31, 2022, the contents of which are incorporated herein by reference.

BACKGROUND

The present disclosure pertains to database systems and in particular to transaction processing.

Cloud database systems were offered software as a service (providing specific services) and provide a platform as a service (providing certain infrastructure). Before that, infrastructure as a service was available where infrastructure could be rented and a database could be operated using it. Beyond this, the "serverless" cloud architecture allows cloud applications to run without or with less management effort by the user, which is achieved using "elastic" infrastructure that scales according to load and performance requirements. For instance, a serverless database system may allocate additional resources (e.g., computer processing and memory resources) when load from queries and transactions (i.e., a set of one or more queries) is high and these resources may be deallocated as the load decreases.

While the serverless architecture is advantageous in that it can meet performance requirements through dynamic scaling of resources, the serverless architecture also has some potential drawbacks. In a serverless environment, communication between the scalable resources may be slower compared to non-serverless designs. Such communication may occur when implementing a concurrency control protocol to ensure that transactions are executed correctly by the serverless database system. Accordingly, there is a need for improved efficiency when processing transactions in a serverless environment.

The present disclosure addresses these issue and others, as further described below.

SUMMARY

Some embodiments provide a computer system. The computer system may comprise one or more processors. The computer system may comprise one or more machine-readable medium coupled to the one or more processors and storing computer program code comprising sets instructions executable by the one or more processors. The instructions may be executable by the one or more processors to Some embodiments provide one or more non-transitory computer-readable medium storing computer program code comprising sets of instructions. The computer program code may include sets of instructions to Some embodiments provide a computer-implemented method. The method may comprise The following detailed description and accompanying drawings provide a better understanding of the nature and advantages of the present disclosure.

DETAILED DESCRIPTION

Figure 1:
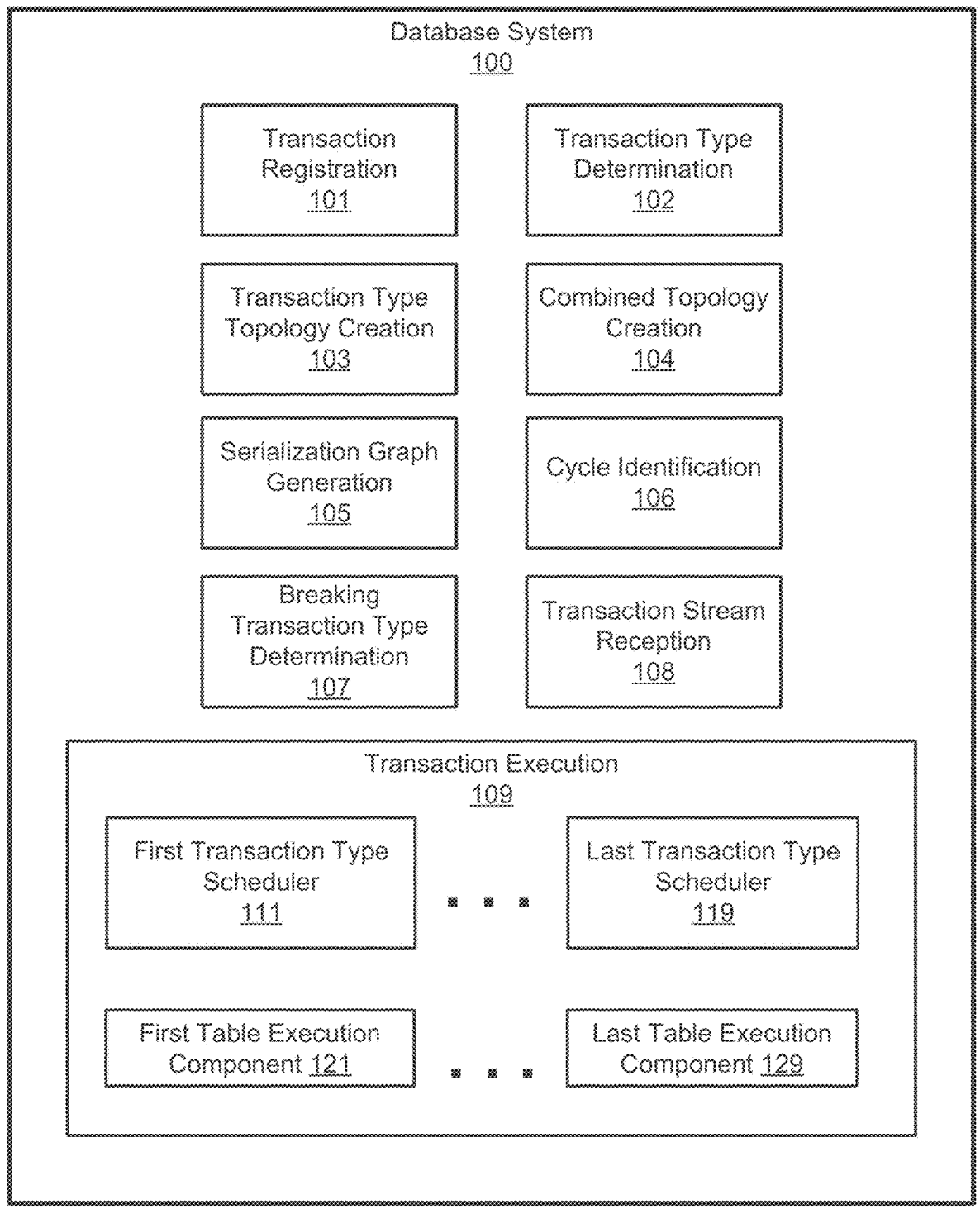
FIG. 1 shows a diagram of a database system implementing a concurrency control protocol, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above, the "serverless" cloud architecture allows cloud applications to run using "elastic" infrastructure that scales according to load and performance requirements. For instance, a serverless database system may allocate additional resources (e.g., computer processing and memory resources) when load from queries and transactions (i.e., a set of one or more queries) is high and these resources may be deallocated as the load decreases. This increased in allocated resources may be referred to as "scale-out" and deallocation may be referred to as "scale-in." In the serverless architecture, resources may be scaled out and scaled in without the application developer needing to specify a particular amount of compute and storage resources that their application should be deployed to the cloud with. The serverless architecture handles the scaling of resources as they are needed.

Two example scale-out database management system architectures include the "aggregated shared-nothing" architecture and the "disaggregated shared-disk" architecture. Other different architectures are possible. In the "aggregated shared-nothing" architecture, there are partitioned database management system instances with database partitions that may be coupled over a network. One possible advantage of the "aggregated shared-nothing" architecture is that it provides higher performance for partitionable workloads but possible disadvantages include tedious scaling due to repartitioning and degrading under skew.

In the "disaggregated shared-disk" architecture, there is separation of compute resources and storage resources and the compute resources may access the shared-disk over a network. One possible advantage of the "disaggregated shared-disk architecture" is that it provides good skew handling and independent elasticity of compute and storage while a possible disadvantage is that data may always be pulled into the compute layer.

Traditionally, database management system architecture is static. However, static architectures may not last as workloads are versatile, shifting, and unforeseeable. As such, there is no single best database management system architecture for the cloud. Furthermore, platforms as well as hardware evolve and diversify (e.g., cloud or new accelerators require re-architecting). Static architectures have performance compromises and are not future proof.

The present disclosure describes a non-static "architecture-less" database management system that applies more fine-grained "serverless" scale-out and scale-in techniques. For instance, rather than adding entire database instances (as is the case for the "aggregated shared-nothing" and "disaggregated shared-disk" architectures), the database architecture itself may dynamically change. That is, there is no fixed architecture for the database management system deployment. Instead, the database deployment is automatically shaped to be best fit to a particular transaction (e.g., set of one or more database queries). This "architecture-less" technique is advantageous in that the dynamically changing architecture is optimized for each transaction and it the database management system may adapt to new platforms and hardware. As further described below, simultaneous processing of multiple transactions may be performed according to a concurrency control protocol to ensure correct execution (e.g., proper sequencing or ordering of transaction processing).

The present disclosure provides a concurrency control protocol for that ensures proper sequencing of transactions in a serverless, architecture-less database. An overview of transaction processing and the concurrency control protocol are described below with respect to FIG. 1 and FIG. 2. Further details of the architecture-less configuration and the concurrency protocol are described below with respect to FIG. 3-12.

FIG. 1 shows a diagram of a database system 100 implementing a concurrency control protocol, according to an embodiment. The database system 100 includes software components includes a transaction registration component 101, a transaction type determination component 102, a transaction type topology creation component 103, a combined topology creation component 104, a serialization graph generation component 105, a cycle identification component 106, a breaking transaction type determination component 107, a transaction stream reception component 108, a transaction execution component 109, as well as other components for performing database functionality (not shown).

The transaction registration component 101 may be configured to register and store transaction types. Information regarding the transaction type may be input by a user and this information may be stored in a database system. The information regarding the transaction type may include which particular tables are accessed by transactions of that type and any dependencies between the data retrieved from the tables when executing transactions of that type.

The transaction type determination component 102 may be configured to determine a plurality of types of transactions executable on a database. Each type of transaction may include a corresponding set of one or more queries accessing particular tables of the database. The types of transactions may be input by a user of the database systems. Such registered transaction types may be stored on the database system and used to generate topologies and perform analysis as discussed herein. Note that the type of transactions are types, and not transactions themselves. During runtime an incoming transaction of a particular type may use different parameters compared to other transactions of that same type.

The transaction type topology creation component 103 may be configured to determine a transaction topology for each type of transaction in the plurality of types. The transaction topology for a particular type of transaction may include one or more nodes representing particular tables of the database accessed by that particular type of transaction and directed edges between the one or more nodes indicating data dependencies for that particular type of transaction. Examples of topologies for a transaction type are shown in diagram 503 and 504 of FIG. 5 and are further discussed below.

In some embodiments, the data dependencies indicated by the transaction topologies are determined based on an ordering of database statements and intermediate results between the database statements.

The combined topology creation component 104 may be configured to combine the transaction topologies for each type of transaction into a combined topology. The combined topology combines the nodes of the individual transaction topologies such that the edges for different transaction types may point to the same nodes. Such combined topologies are described below and are shown in diagram 505 of FIG. 5, diagrams 601-604 of FIG. 6, diagrams 701-703 of FIG. 7, and diagrams 801 and 208 of FIG. 8.

The serialization graph generation component 105 may be configured to generate a serialization graph representing the combined topology. The serialization graph may include one or more nodes representing types of transactions and directed edges between the nodes indicating a before/after order of accessing a particular table of the database by the transactions. Serialization graphs are described in further detail below and are shown in diagram 704-706 in FIG. 7, diagrams 803 and 804 in FIG. 8, diagram 901 in FIG. 9, diagram 1001 in FIG. 10, diagram 1101 in FIG. 11, and diagram 1201 in FIG. 12.

Figure 7:
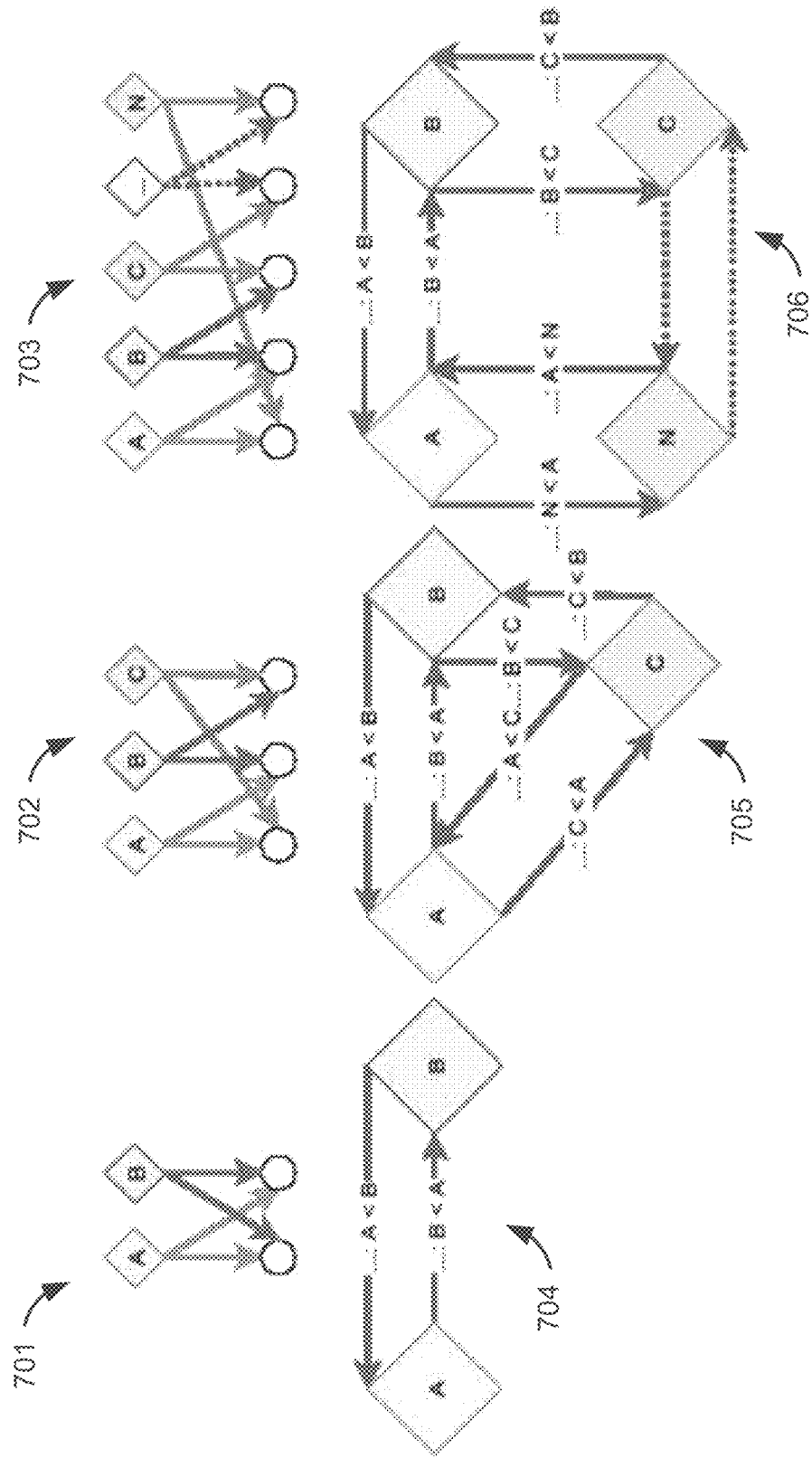
FIG. 7 shows diagrams of topologies and their corresponding serialization graphs, according to an embodiment.

The cycle identification component 106 may be configured to identify one or more cycles in the serialization graph. The cycles may be identified based on a determination that a set of directed edge starting from a particular node points back to that particular node to form a cycle. Diagram 704 in FIG. 7 shows an example cycle between transaction type A and transaction type B (from A to B and back to A). Diagram 705 in FIG. 7 shows an example cycle from transaction type A to transaction type B to transaction type C and back to transaction type A (the inner cycle) and another cycle from transaction type C to transaction type B to transaction type A and back to transaction type C (the outer cycle). Examples of cycles are also shown in diagram 706 of FIG. 7 and diagram 803 of FIG. 8.

In some embodiments, each of the one or more cycles may indicate a serialization violation in which an earlier transaction accesses a particular table after a later transaction.

The breaking transaction type determination component 107 may be configured to determine a breaking transaction type for each of the one or more cycles. A corresponding breaking transaction type for a particular cycle may break the particular cycle when the corresponding breaking transaction type is a last executed transaction in a current epoch. One breaking transaction type may break more than one cycle if the cycles overlap. Breaking transaction types are described below and an example breaking transaction type is shown in diagram 804 of FIG. 8. In diagram 804, transaction type A is the breaking type of transaction and transaction types B, D, and D are safe types of transactions (non-breaking types of transactions).

The transaction stream reception component 108 may be configured to receive requests to execute a stream of transactions in an order on a database. Each transaction in the stream of transaction may have a corresponding type that is one of the plurality of types of transactions. Proper serialization of these transactions requires that the results of executing the transaction in parallel is the same as the result of executing the transactions in a serial order (not in parallel). The transaction processing protocol described herein achieves proper serialization by identifying breaking transaction types that can break cycles and scheduling transactions for execution based on whether the transaction is a breaking type or not, as described herein.

The transaction execution component 109 includes a first transaction type scheduler 111 that is configured to schedule transactions have the first type. There may be a plurality of types of transactions registered and there may be a transaction scheduler for each type. This is represented in FIG. 1 as ellipsis (" . . . ") between the first transaction type scheduler 111 and a last transaction type scheduler 119. Each transaction scheduler may be implemented by a separate "execution component." Execution components (also called "any components") are described in further detail below.

The transaction execution component 109 also includes a first table execution component 121 configured to access a first table of a plurality of tables (not shown in FIG. 1) in the database. There may be a plurality of table execution components, each configured to access a different table of the database. This is represented in FIG. 1 as ellipsis (" . . . ") between the first table execution component 121 and a last table execution component 129. Execution components (also called "any components") are described in further detail below.

The transaction execution component 109 may be configured to execute the stream of transactions by scheduling execution of transactions that do not have the breaking transaction type in the current epoch, scheduling a transaction having the breaking transaction type as a last transaction in the current epoch, and scheduling later transaction not having the breaking transaction type in a next epoch. The transactions having the breaking transaction type may be executed after every transaction scheduled in the current epoch and may be executed before every transaction scheduled in the next epoch. This scheduling and execution of breaking transaction types prevents cycles and ensures that the result of executing the stream of transactions in parallel is the same as if they had been executed serially in the order they were received.

In some embodiments, the scheduling of the transaction having the breaking transaction type includes scheduling tombstone transactions for each of the plurality of types of transactions. In such embodiments, transactions scheduled after the tombstone transaction are scheduled for the next epoch and are not executed until the tombstone transactions for each of the plurality of types of transactions have been executed.

In some embodiments, the scheduling of the transaction having the breaking transaction type includes sending a multi-cast message indicating the next epoch to transaction schedulers for transactions that do not have the breaking transaction type.

In some embodiments, the scheduling of the execution of the transactions that do not have the breaking transaction type includes tagging the transactions with a tag indicating a transaction execution epoch for executing that transaction.

In some embodiments, the scheduling of each type of transaction is performed by a separate execution component. In such embodiments, particular tables of the database may be accessed using a different set of execution components. Execution components are described below and are shown in diagram 301 and 302 of FIG. 3 and diagram 401-406 of FIG. 4. Furthermore, the execution components may be represented by the nodes in the topology diagrams shown in FIGS. 5-8.

Figure 2:
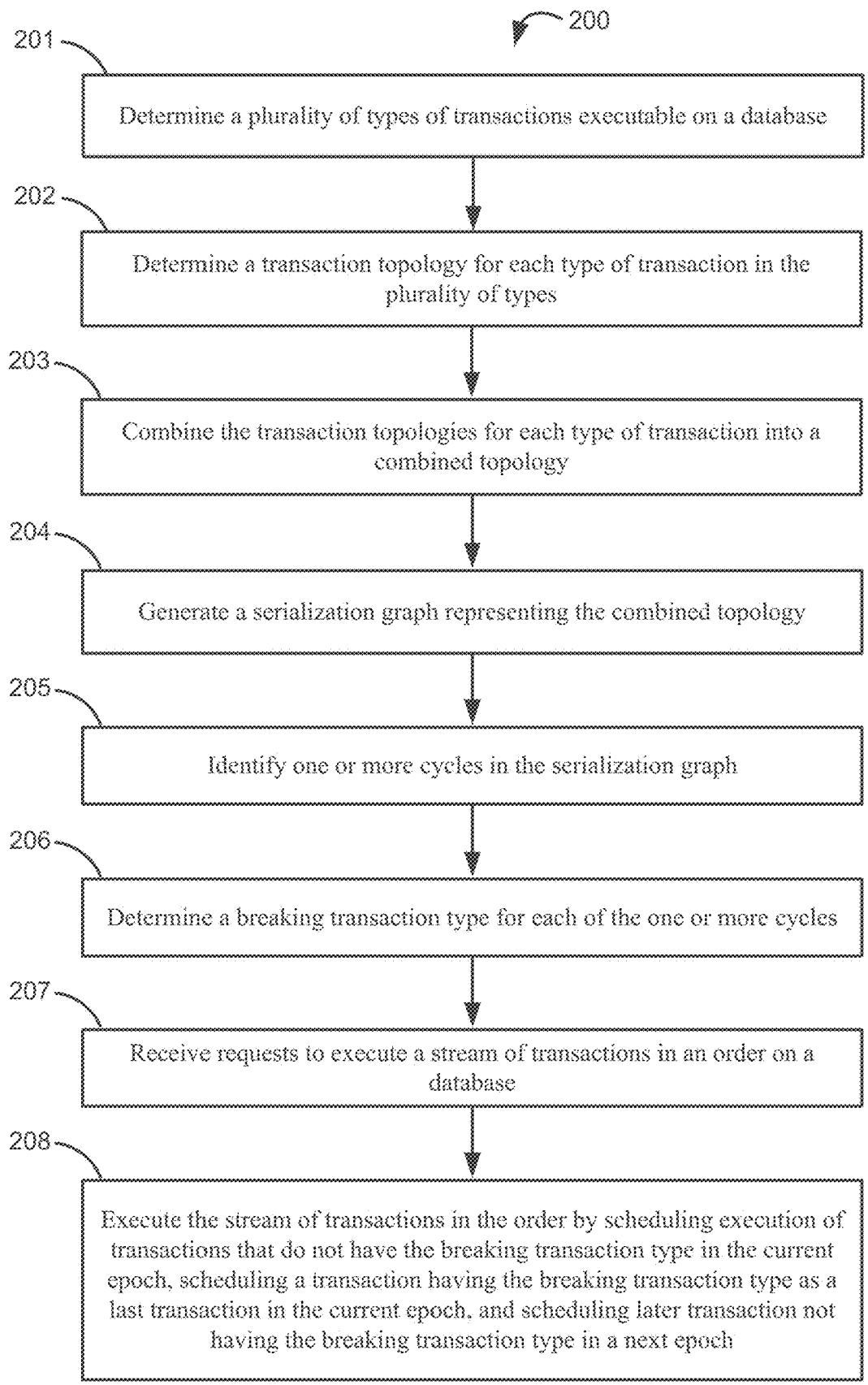
FIG. 2 shows a diagram of a method for concurrency control, according to an embodiment.

FIG. 2 shows a diagram 200 of a method for concurrency control, according to an embodiment. This method may be implemented by a database system, such as the one described above with respect to FIG. 1. The method may be implemented by computer program code stored on a non-transitory computer readable storage medium. The method described below with respect to FIG. 2 may implement similar functionality as the functions of the database system 100 described above with respect to FIG. 1.

At 201, the method may determine a plurality of types of transactions executable on a database. Each type of transaction may include a corresponding set of one or more queries accessing particular tables of the database. The types of transactions may be input by a user of the database systems. Such registered transaction types may be stored on the database system and used to generate topologies and perform analysis as discussed herein. Note that the type of transactions are types, and not transactions themselves. During runtime an incoming transaction of a particular type may use different parameters compared to other transactions of that same type.

At 202, the method may determine a transaction topology for each type of transaction in the plurality of types. The transaction topology for a particular type of transaction may include one or more nodes representing particular tables of the database accessed by that particular type of transaction and directed edges between the one or more nodes indicating data dependencies for that particular type of transaction. Examples of topologies for a transaction type are shown in diagram 503 and 504 of FIG. 5 and are further discussed below.

In some embodiments, the data dependencies indicated by the transaction topologies are determined based on an ordering of database statements and intermediate results between the database statements.

At 203, the method may combine the transaction topologies for each type of transaction into a combined topology. The combined topology combines the nodes of the individual transaction topologies such that the edges for different transaction types may point to the same nodes. Such combined topologies are described below and are shown in diagram 505 of FIG. 5, diagrams 601-604 of FIG. 6, diagrams 701-703 of FIG. 7, and diagrams 801 and 208 of FIG. 8.

At 204, the method may generate a serialization graph representing the combined topology. The serialization graph may include one or more nodes representing types of transactions and directed edges between the nodes indicating a before/after order of accessing a particular table of the database by the transactions. Serialization graphs are described in further detail below and are shown in diagram 704-706 in FIG. 7, diagrams 803 and 804 in FIG. 8, diagram 901 in FIG. 9, diagram 1001 in FIG. 10, diagram 1101 in FIG. 11, and diagram 1201 in FIG. 12.

At 205, the method may identify one or more cycles in the serialization graph. The cycles may be identified based on a determination that a set of directed edge starting from a particular node points back to that particular node to form a cycle. Diagram 704 in FIG. 7 shows an example cycle between transaction type A and transaction type B (from A to B and back to A). Diagram 705 in FIG. 7 shows an example cycle from transaction type A to transaction type B to transaction type C and back to transaction type A (the inner cycle) and another cycle from transaction type C to transaction type B to transaction type A and back to transaction type C (the outer cycle). Examples of cycles are also shown in diagram 706 of FIG. 7 and diagram 803 of FIG. 8.

In some embodiments, each of the one or more cycles may indicate a serialization violation in which an earlier transaction accesses a particular table after a later transaction.

At 206, the method may determine a breaking transaction type for each of the one or more cycles. A corresponding breaking transaction type for a particular cycle may break the particular cycle when the corresponding breaking transaction type is a last executed transaction in a current epoch. One breaking transaction type may break more than one cycle if the cycles overlap. Breaking transaction types are described below and an example breaking transaction type is shown in diagram 804 of FIG. 8. In diagram 804, transaction type A is the breaking type of transaction and transaction types B, D, and D are safe types of transactions (non-breaking types of transactions).

At 207, the method may receive requests to execute a stream of transactions in an order on a database. Each transaction in the stream of transaction may have a corresponding type that is one of the plurality of types of transactions. Proper serialization of these transactions requires that the results of executing the transaction in parallel is the same as the result of executing the transactions in a serial order (not in parallel). The transaction processing protocol described herein achieves proper serialization by identifying breaking transaction types that can break cycles and scheduling transactions for execution based on whether the transaction is a breaking type or not, as described herein.

At 208, the method may execute the stream of transactions by scheduling execution of transactions that do not have the breaking transaction type in the current epoch, scheduling a transaction having the breaking transaction type as a last transaction in the current epoch, and scheduling later transaction not having the breaking transaction type in a next epoch. The transactions having the breaking transaction type may be executed after every transaction scheduled in the current epoch and may be executed before every transaction scheduled in the next epoch. This scheduling and execution of breaking transaction types prevents cycles and ensures that the result of executing the stream of transactions in parallel is the same as if they had been executed serially in the order they were received.

In some embodiments, the scheduling of the transaction having the breaking transaction type includes scheduling tombstone transactions for each of the plurality of types of transactions. In such embodiments, transactions scheduled after the tombstone transaction are scheduled for the next epoch and are not executed until the tombstone transactions for each of the plurality of types of transactions have been executed.

In some embodiments, the scheduling of the transaction having the breaking transaction type includes sending a multi-cast message indicating the next epoch to transaction schedulers for transactions that do not have the breaking transaction type.

In some embodiments, the scheduling of the execution of the transactions that do not have the breaking transaction type includes tagging the transactions with a tag indicating a transaction execution epoch for executing that transaction.

In some embodiments, the scheduling of each type of transaction is performed by a separate execution component. In such embodiments, particular tables of the database may be accessed using a different set of execution components. Execution components are described below and are shown in diagram 301 and 302 of FIG. 3 and diagram 401-406 of FIG. 4. Furthermore, the execution components may be represented by the nodes in the topology diagrams shown in FIGS. 5-8.

As mentioned above, the database architecture may dynamically change while processing transactions. That is, there is no fixed architecture for the database management system deployment. The database deployment is automatically shaped to be best fit to a particular transaction (e.g., set of one or more database queries). This "architecture-less" technique is advantageous in that the dynamically changing architecture is optimized for each transaction and it the database management system may adapt to new platforms and hardware.

Figure 3:
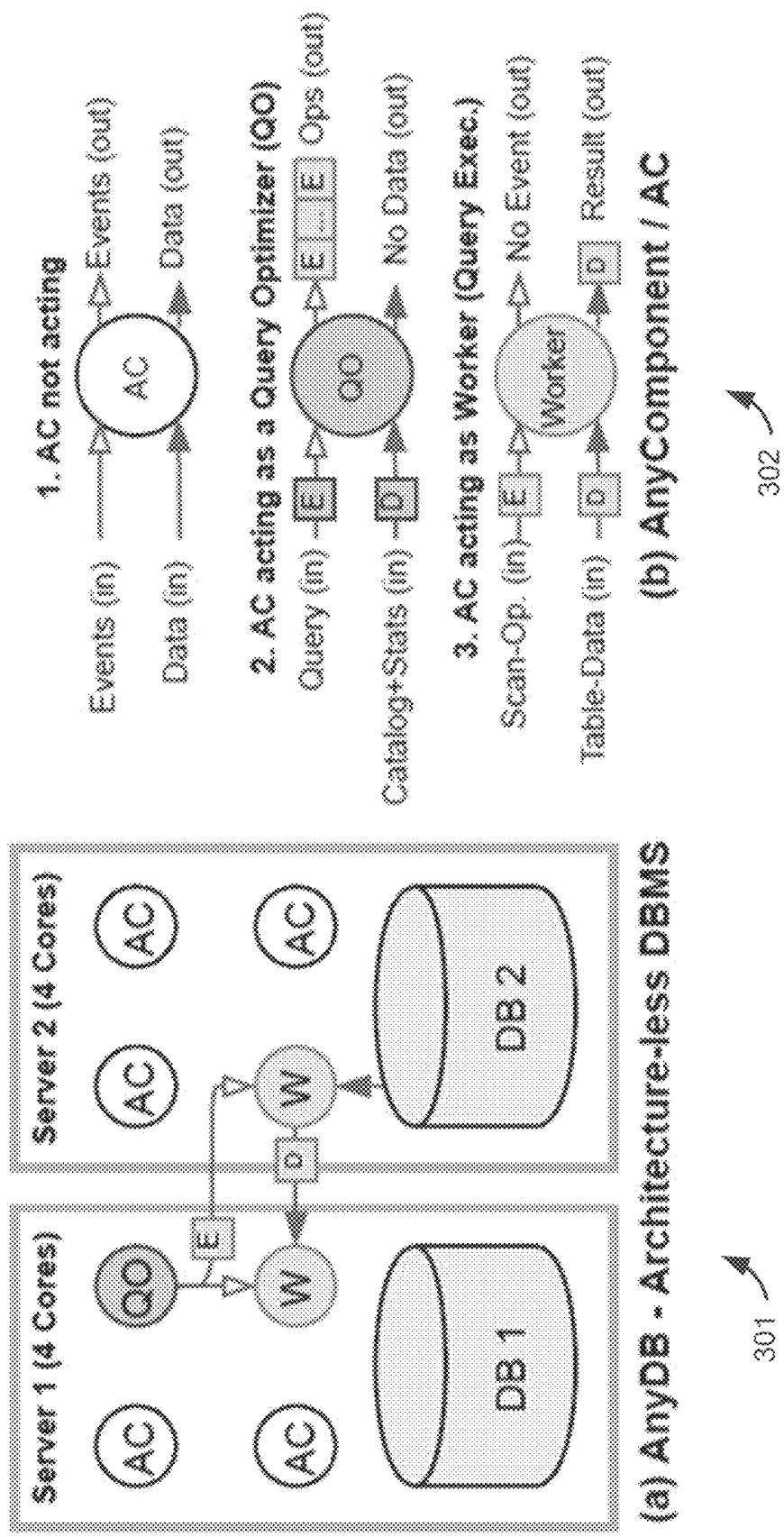
FIG. 3 shows diagrams of an architecture-less database management system, according to an embodiment.

FIG. 3 shows diagrams 301, 302 of an architecture-less database management system, according to an embodiment.

Diagram 301 shows an architecture-less database management system (DBMS) including a plurality of "any components" that may be configured as a query optimizer (QO) component, a worker component, or another database component. The database includes a plurality of small execution components/entities (e.g., job executors), which may be referred to as "any components" as they can be configured to function as any databases component as needed. These execution components can be configured and reorganized to create different database architectures for each query (e.g., select, update, delete, or insert queries) or transaction (set of one of more queries).

In this example, the database system includes two servers, "server 1" having four cores (e.g., with four configurable execution components) and "server two" also having four cores. Server 1 includes a first database "DB1" and Server 2 includes a second database "DB2." In this example, Server 1 has one execution component (AC) configured as a query optimizer (QO) and one execution component configured as a worker (W) while Server 2 has one execution component (AC) configured as a worker. As shown in diagram 301, the execution component acting as a query optimizer outputs events to the worker of Server 1 and to the worker of Server 2. Table data from the second database DB2 is provided as input to the worker of Server 2, which outputs result data to the worker of Server 1.

Diagram 301 shows just one possible configuration of execution components for processing transactions on a database.

Diagram 302 shows an execution component (i.e., "any components," AC) that is configurable to receive input events and input data and output events and data. The execution component ("any component") is a software component that may operate as, or similar to, a "job executor." The execution component has input channels and output channels. Input channels can be events. These events may configure or instruct the execution component. The events may describe what database components this executor component should execute for the moment. The data is the steam of data to be processed. In this database system, streams of events may be generated based on received transactions and these event streams as well as data may flow through the execution components to form a database architecture.

Diagram 302 also shows an execution component (AC) acting as a query optimizer (QO) and as a worker (e.g., query executor component). When acting as a query optimizer, the execution component is configured to receive a query event as input and to receive catalog data and stats data as input. The execution component configured as a query optimizer is configured to output a stream of events based on the input query event. It does not provide output data.

When acting as a worker, the execution component (AC) receives a scan-operation event as input and table-data as input. As a worker, the execution component outputs result data determined based on the scan-operation event and the input table data. It does not output events.

Figure 4:
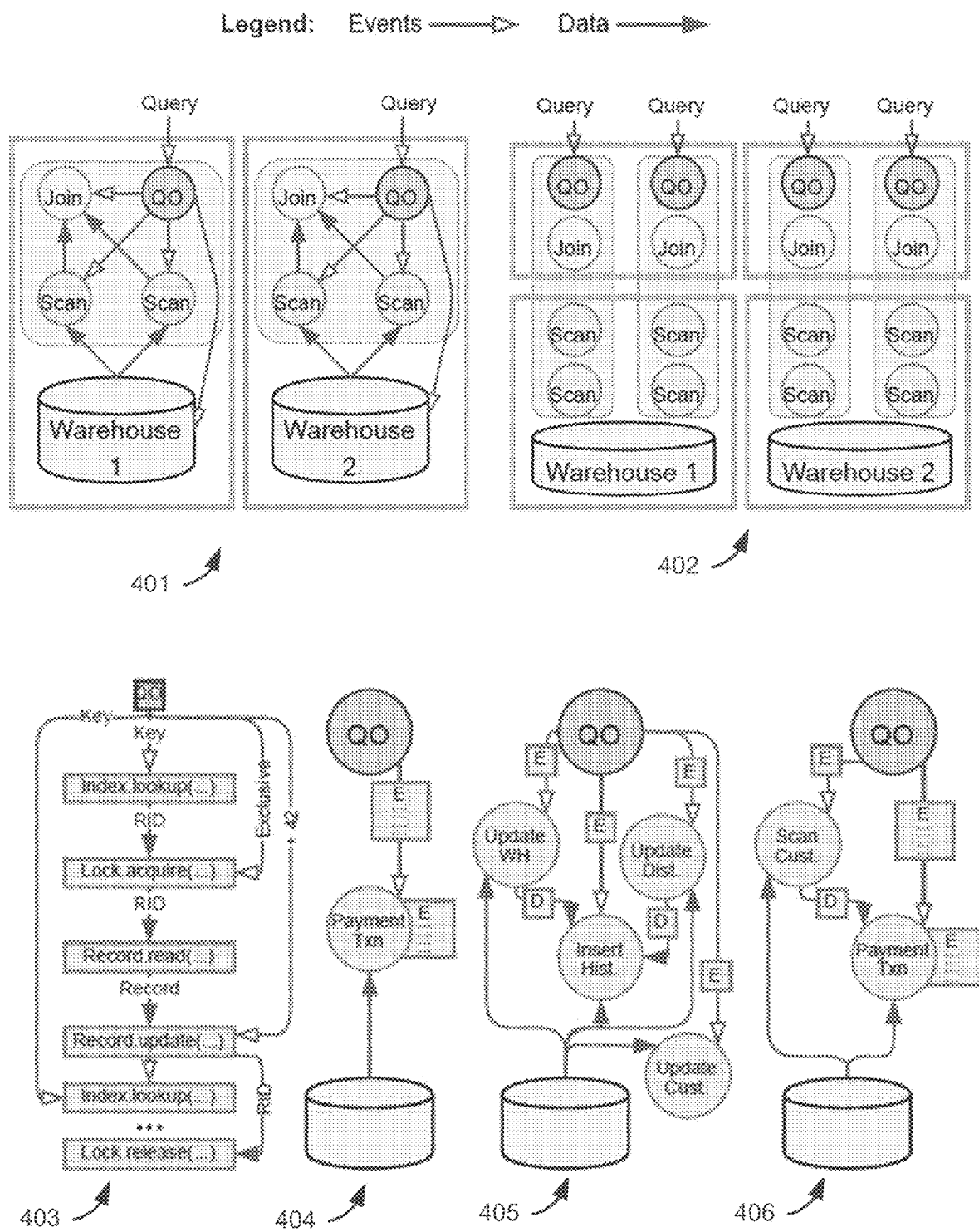
FIG. 4 shows diagrams of example architectures based on the architecture-less database management system, according to an embodiment.

Thus, as transactions are received by the database system for processing, the execution components may operate in different roles with events and data streaming through the components to form the database functionality. FIG. 4 shows diagrams 401-406 of example architectures based on the architecture-less database management system, according to an embodiment. As one example, when database load is low, the system may be organized as a "Shared-Nothing" architecture as shown in diagram 401. Events are dispatched to configure certain execution components as a query optimizer, a join operator, or a scan operator. As another example, when load is increased, the system may be reorganized into a "shared-disk" architecture as shown in diagram 402. In diagram 401 and 402, the gray boxes indicate sets of resources. Diagrams 403, 404, 405, and 406 show other possible configurations into which the execution components may be organized to form a database architecture Such architecture-less database systems may use streaming execution in which the system continuously and elastically executes transactions and other requests. Events and data are routed such that data movement is minimal and compute constraint is met (maximizing throughput). The present disclosure describes a transaction processing protocol that provides serializable event routing that achieves consistency in transaction processing that is enforced by topologies of event streams. The topologies are represented as "nodes" (implemented by "AC" execution components) with input of data and/or events and output of data and/or events. Proper parallel transaction processing (e.g., order of processing) may be achieved using the concurrency control protocol disclosed herein. The concurrency control protocol is achieved by constructing topologies of transaction types, based on stored or registered types of transactions, and determining an overall topology that ensures serializable consistency, as further described below.

In transaction processing concurrency control, a "conflict" refers to a situation when two or more transactions access a table in a different order compared to when the processing of the transactions was initiated. For example, two transactions may be updated the same row in a database table. The concurrency control protocol described herein mitigates conflicts and reduces coordination overhead (e.g., communication between execution components) by constructing a topology of execution components, having data and event streams therebetween, which enforces serializability with partial ordering based on identified conflicts.

Unlike certain other concurrency control protocols (e.g., two-phase locking), this protocol does not acquire "ownership" of (e.g., a lock on) particular tables or rows, which requires communication to establish and release ownership. Such communication would degrade performance in an architecture-less environment having numerous smaller execution components. Rather than require coordination to assume ownership of a row or table, the present concurrency control protocol routes transactions that access the table to the execution component that will execute the table access. That is, the execution component in the system handles access to a particular table or rows of a table and transactions are routed to the execution component where the data is located in order to provide consistent execution. To reiterate, concurrency control is not provided by taking ownership of tables and communicating regarding the ownership. Instead, concurrency control is provided by establishing a topology of execution components having paths (routes) of data streams that allows transaction processing to be ordered correctly without the concept of ownership (e.g., locks).

Figure 5:
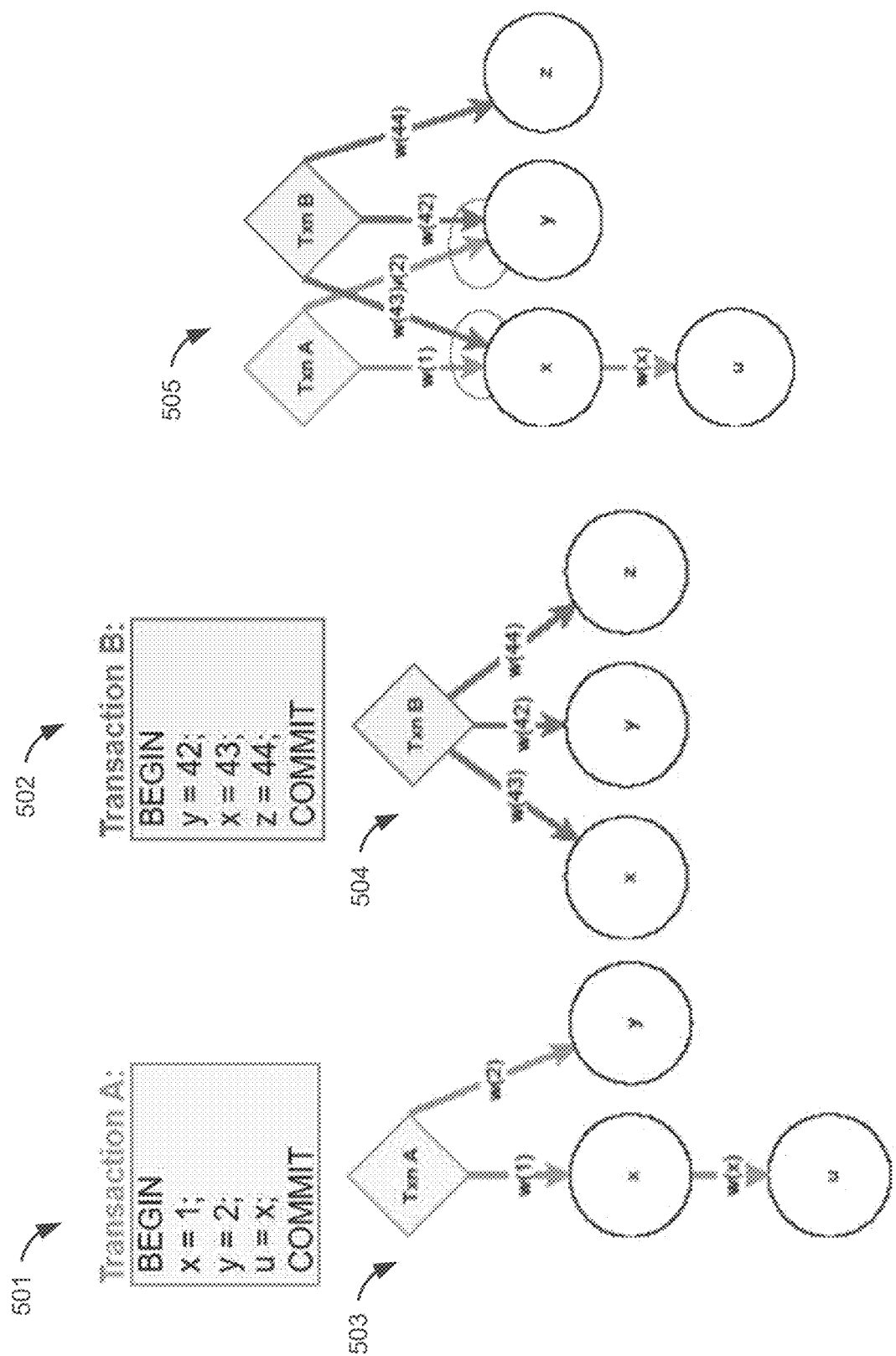
FIG. 5 shows diagrams of transactions and their corresponding data dependency topologies, according to an embodiment.

FIG. 5 shows diagrams 501-505 of transactions 501, 502 and their corresponding data dependency topologies 503-505, according to an embodiment. In these topology diagrams, the circles represent execution components (AC) as discussed above. Diagram 501 shows pseudo-code for "Transaction A," a first type of transaction and diagram 502 shows pseudo-code for "Transaction B," a second type of transaction. Diagram 503 shows a topology indicating data dependencies (intermediate results) for Transaction A. Diagram 504 shows a topology indicating data dependencies for Transaction B. These transaction types and topologies are examples for purposes of illustration. In other embodiments different transaction types may be registered or stored and their corresponding topologies may be constructed.

In diagram 501, the pseudo-code shows that Transaction A accesses a first table "x," a second table "y," and a third table "u" while the pseudo-code for Transaction B, shown in diagram 502, accesses the second table "y," the first table "x," and a fourth table "z." Transactions of type "A" will access tables x, y, and u (with transaction-specific parameters) and transactions of type "B" will access tables y, x, and z (with transaction-specific parameters). The code for the transaction may be analyzed to determine which tables are accessed, and determine what types of operations (e.g., reads, writes, etc.) are performed on the table in order to generate the corresponding topology for that transaction type, as shown in diagrams 503 and 504.

To construct topologies of types of transactions the data-dependencies (*intermedia* results) are determined and commit-dependencies are determined. For data-dependencies, an ordering of statements according to data passed between those statements is determined and program analysis of (stored or registered) transaction types is used to construct the topology. With respect to commit-dependencies, all writing events occur before the last potential abort point in the transaction, only abortable events require recovery and cause cascading aborts, transactions should only abort due to deterministic reasons (e.g., constraints), and an edge from a node with an abortable event to nodes with non-abortable writing events can be added.

As shown in diagrams 503 and 504, the topology for transactions of type A and transactions of type B both access table x and table y. As such, there may be a conflict on table x and table when a transaction of type A is run in parallel with a transaction of type B. That is, a topology with several types of transactions may not guarantee serializability. To ensure serializability, the transaction processing protocol should ensure that table x and table y are accessed in transaction order such that if a transaction of type A is initiated before a transaction of type B, the access of table x and table y occurs before the transaction of type B accesses either table x or table y.

Diagram 505 shows a combined topology that combines the topologies for transaction type A and transaction type B. This topology shows the conflicts that may occur between transaction type A and transaction type B when accessing table x and when accessing table y.

Figure 6:
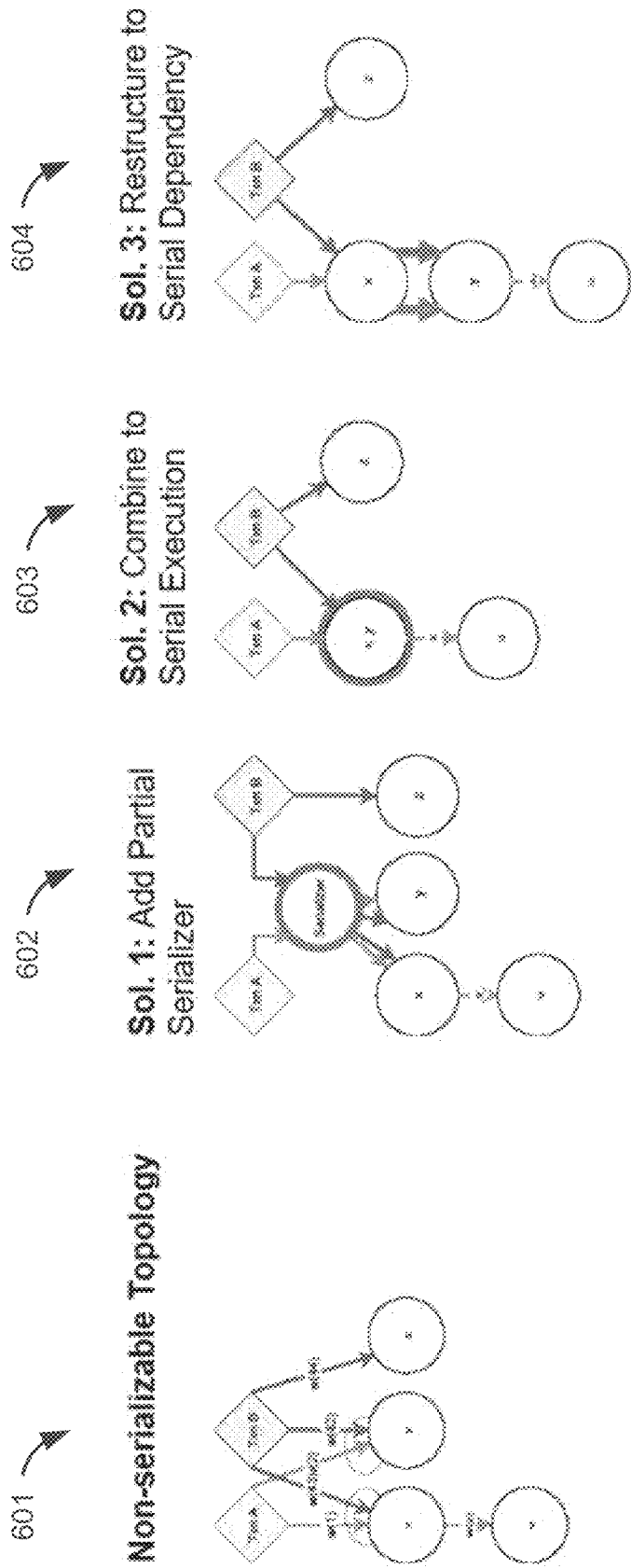
FIG. 6 shows diagrams of a non-serializable topology and solutions for enforcing serializability, according to an embodiment.

To prevent such conflicts, the transactions may be partially ordered. That is an order may be enforced for accesses to table x and table y but leave access to table z unordered (as there is no conflict for accessing table z), in this example. FIG. 6 shows diagrams 601-604 of a non-serializable topology 601 and solutions 602, 603, 604 for enforcing serializability, according to an embodiment. Diagram 601 is a reproduction of diagram 505 in FIG. 5. It shows a non-serializable topology having conflicts between transaction type A and transaction type B on table x and table y as mentioned above. Compared to the non-serializable topology shown in diagram 601, diagrams 602, 603, and 604 for different topologies that enforce serializability.

Solution 1 shown in diagram 602 adds a partial serializer node (e.g., a serializer execution component) that receives input from transaction type A and transaction type B and outputs to table x (e.g., the execution component handling access to table x) and to table y (e.g., the execution component handling access to table x). In this solution, the serializer execution component receives all transactions that access x and y and it tracks which transaction came first. It may give the transactions an order using a counter. For instance, the serializer execution component may tag passing events with a "happens-before" relation. The particular serializer provides freedom of placement trading communication overhead vs. impact on non-conflicting nodes: place such that the number of outgoing edges is minimal (lower communication for the serializer), or place immediately before conflicts (only conflicts impacted by serialization overhead).

Solution 2 shown in diagram 603 combines nodes to enforce serial execution. As shown, the node for table x and the node for table y are combined into a single node "x, y." That is, a single execution component will handle access of both table x and table y. In this solution, the two queries for x and y are executed together rather than using a serializer with a counter. This serial execution solution may combine conflicts (relation/partition/ . . . ) to a single node in the topology. It may also atomically execute all events a specific transaction on this combined data granule.

Solution 3 shown in diagram 604 restructures the topology to a serial dependency to enforce serializability. As shown, the node for table y comes after the node for table x such that the accessing of table y depends on the results of accessing table x. Thus, table x is not accessed in parallel with table y. In this solution, although transaction type B is not accessing x, the system still routes transaction B though the node (execution component) for x and this routing enforces a serial order. The execution component for table x may only execute one event at a time, which determines an order. In this solution, transaction type B is routed through node x and forwarded to node y. In this serial dependency solution, the nodes are reordered or have added dependencies such that the topology enforces explicit "happens-before" relation of conflicts.

These three solution are potential topology options for enforcing serializability in this example (refer back to FIG. 5). One solution may perform better or worse compared to the other solutions in particular circumstances. The query optimizer may be configured to determine which solution to use in a certain situation.

Other topologies that enforce serializability may be achieved for the example transactions types A and B and other transaction types and combinations of topologies may have other solutions.

With respect to commit-dependencies, aborts may harm streaming execution due to cascading and recovery. "Piece-Wise Visibility" may prevent cascading and limit recovery dividing transaction into abortable and non-abortable events. Abortable events include all writing events before last potential abort point in transaction. In some circumstances, abortable events may require recovery and may cause cascading aborts. Commit dependencies may prevent cascades and minimize recovery when executing abortable events before non-abortable events and subsequent transactions. A commit dependency may add an edge from node with abortable event to nodes with non-abortable writing events.

The transaction processing protocol may generate serialization graphs based on combined topologies that combine the topologies of one or more transaction types. FIG. 7 shows diagrams 701-706 of topologies 701-703 and their corresponding serialization graphs 704-706, according to an embodiment. Diagram 701 shows a topology of a transaction A and a transaction B accessing the same two nodes. Diagram 704 shows a serialization graph which includes a cycle, indicating a conflict.

In the serialization graphs, the notation "X<Y" indicates that transaction X happened before transaction Y. In diagram 704, the serialization graph indicates that transaction A happened before transaction B ("A<B") and that transaction B happened before transaction A ("B<A"). Both of these possible ordering may happen such that the order is ambiguous. This is referred to as a "cycle," which violates serializability.

Topology 702 shows three transactions A, B, and C where A accesses a first and second table, B accesses the second table and a third table, and C accesses the first and third tables. This topology may be represented by the serialization graph 705. Similarly the transactions in diagram 703 are represented in the serialization graph 706. Cycles of any size break when controlling any two contained conflicts. The corollary is that transactions not causing these conflicts can safely execute in any order. Furthermore, some conflicts may participate in other cycles as well. Thus, intersecting conflicts can break several cycles at once.

The serialization solutions described above may be used to prevent cycles. Formally, for a given cycle in the serialization graph of a topology the following must hold:

Exists C1, C2 in Cycle: C1=(t1, t2) and C2=(t2, t3):
t1<t2⇔t1<t3 or t1>t2⇔t1>t3 (For cycles of size 2: t2=t3)

The execution order of the three transactions participating in two adjacent conflicts must be inverse, such that neither dual cycle appears in any execution history.

Figure 8:
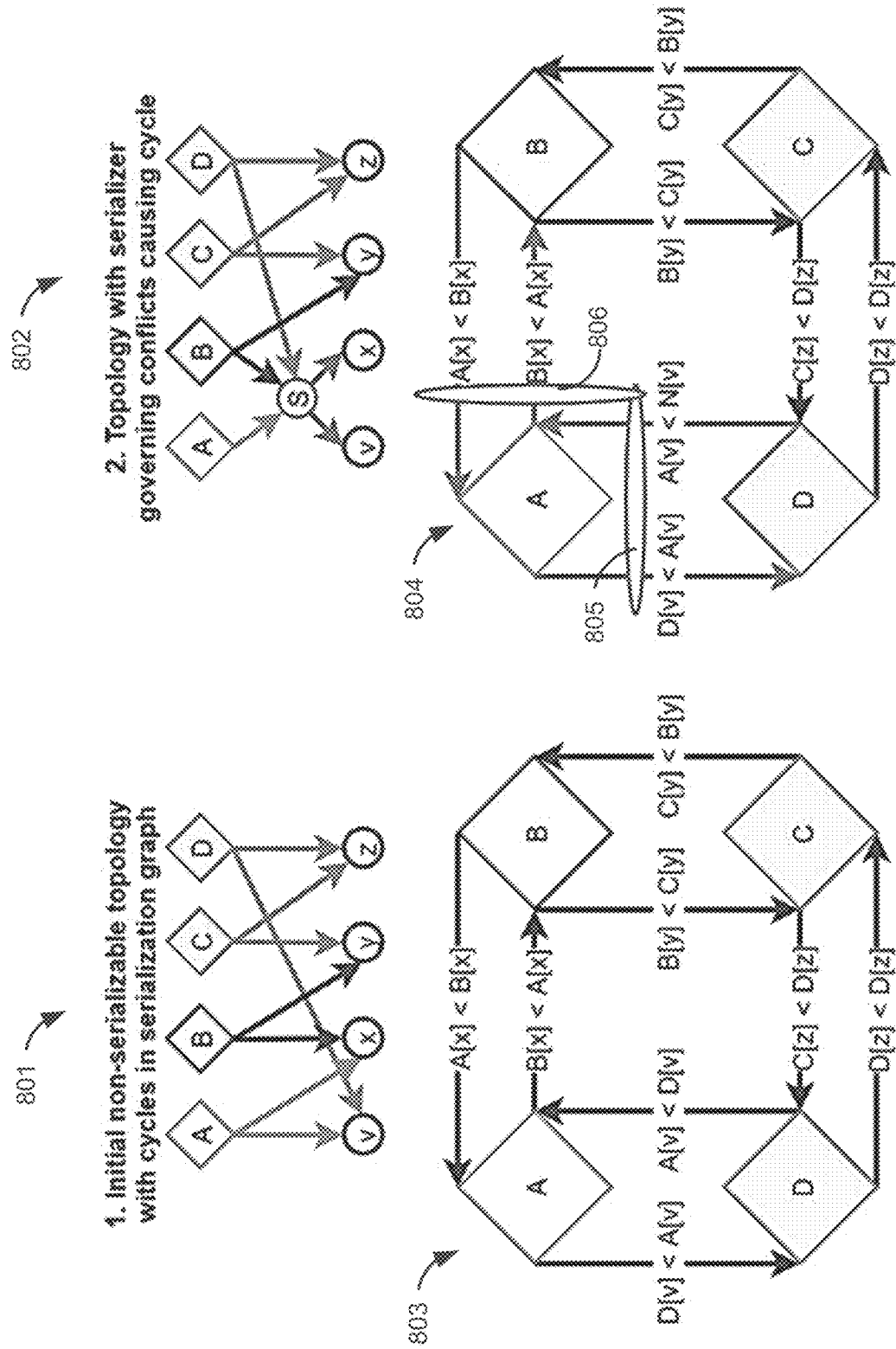
FIG. 8 shows diagrams of a non-serializable topology with cycles compared to a topology with a serializer added to govern conflicts that cause cycles, according to an embodiment.

FIG. 8 shows diagrams 801-804 of a non-serializable topology 801 with cycles compared to a topology 802 with a serializer added to govern conflicts that cause cycles, according to an embodiment. Diagram 801 shows an initial non-serializable topology with cycles in its corresponding serialization graph shown in diagram 803. For instance, there are cycles when transaction A and transaction D access table v, when transaction A and transaction B access table x, when transaction B and transaction C access table y, and when transaction C and transaction D access table z.

As shown in diagram 802, a serializer execution component ("S" in 802) may be added between transactions A, B, and D and tables v, and x. Adding this serializer solves the cycle as described above with respect to diagram 602 in FIG. 6. In the serialization diagram 804 corresponding to the topology of diagram 802, the serializer is shown as elements 805 and 806 between transactions A and B and between transaction A and C. As one example, when transaction A comes before transaction B and transaction A comes before transaction D, then the outer cycle is prevented. This is referred to as a "breaking transaction type."

Figure 9:
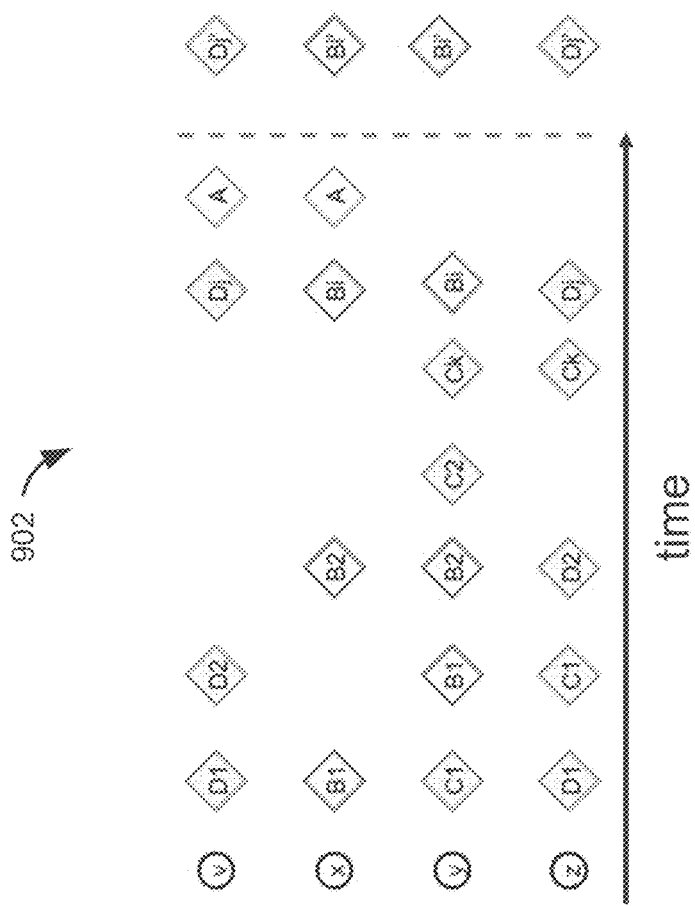
FIG. 9 shows diagrams of a serialization graph with potential cycles and corresponding execution timelines, according to an embodiment.
Figure 9:
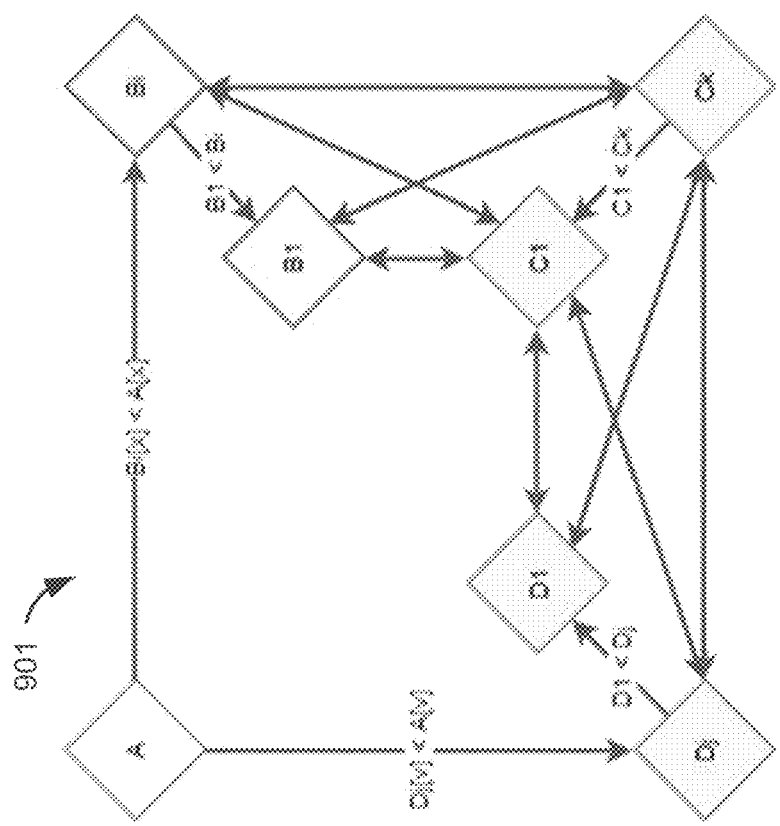

Transactions of type B, transactions of type C, and transactions of type D can be executed in whatever order as long as no transaction of type A is executed. FIG. 9 shows diagrams 901, 902 of a serialization graph 901 for several instances of transaction types B, C, and D, and a corresponding timeline 902, according to an embodiment. As shown in diagram 901, serialization of transactions of type B (transaction B1, Bi), transactions of type C (C1, Ck), and transactions of type D (D1, Dj) may be performed in any order. Diagram 902 shows an example execution timeline for queues of execution components (ACs) where the x-axis represents time and the y-axis represents the execution component hosting attribute (e.g., table v, table x, table y, table z). As shown in the timeline, transactions of type B, C, and D may execute in any order without a cycle. However, when a transaction of type A is to be executed, then proper serialization must ensure correct ordering of transaction A relative to transaction B and transaction D. In this example, if transaction A is to be executed then serialization (e.g., the serializer execution component shown in diagram 802) must ensure that transaction A is executed after earlier transactions Dj and Bi and before transactions Dj' and Bi'.

Figure 10:
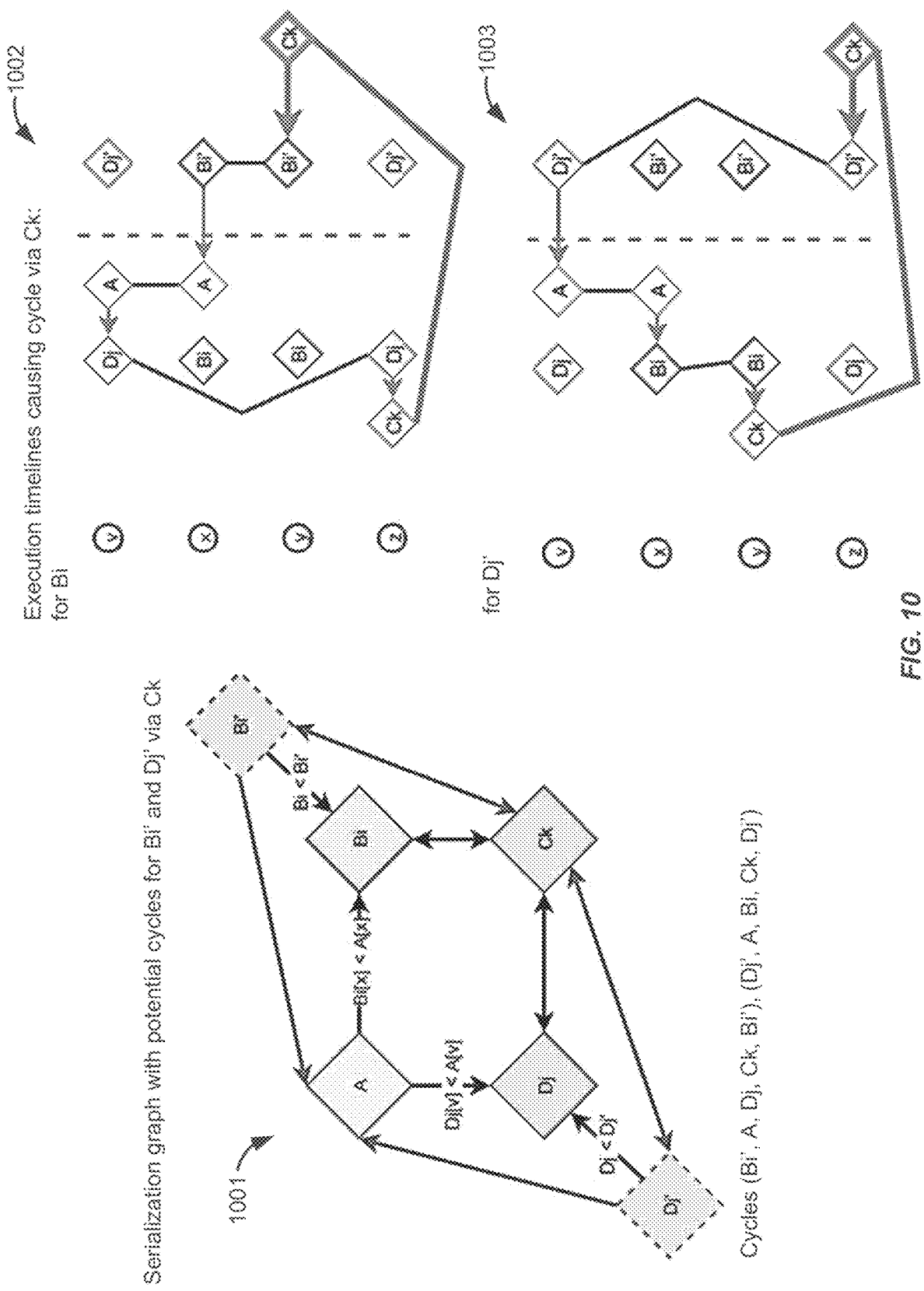
FIG. 10 shows diagrams of a serialization graph that prevents cycles and corresponding execution timelines, according to an embodiment.

FIG. 10 shows diagrams 1001, 1002, 1003 of a serialization graph 1001 with potential cycles and corresponding execution timelines 1002, 1003, according to an embodiment. Diagram 1001 shows a serialization graph with potential cycles for Bi' and Dj' via Ck. The cycles are: (Bi', A, Dj, Ck, Bi') and (Dj', A, Bi, Ck, Dj'). Diagram 1002 shows an execution timeline causing a cycle via Ck for Bi and diagram 1003 shows an execution timeline causing a cycle via Ck for Dj'. Proper serialization ensures that transaction A is executed after transaction Bi and after transaction Dj. That is, transaction Dj is before executed before transaction A and transaction Dj' is executed after transaction A. When a transaction of type A is executed, the transaction processing system separates the stream of transactions into "before and after," thereby preventing cycles.

Figure 11:
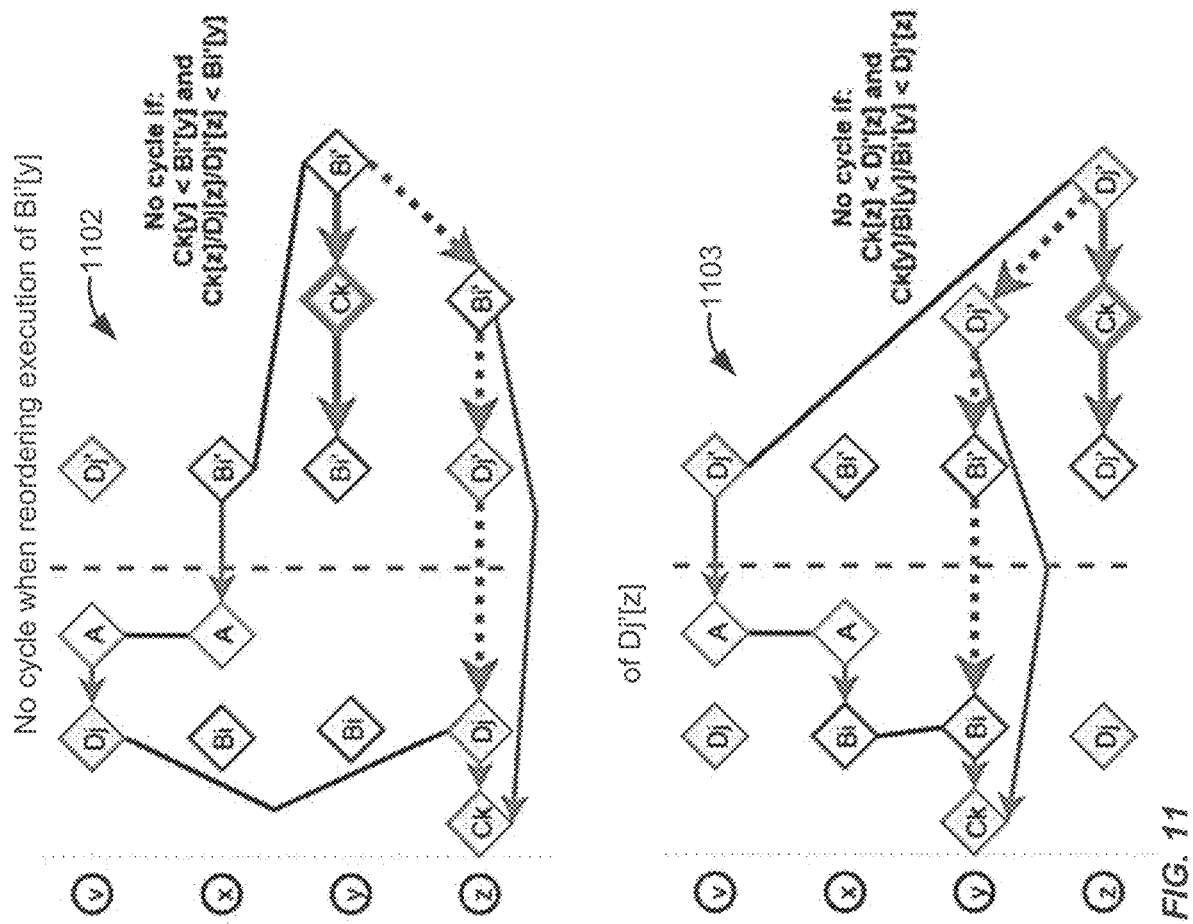
FIG. 11 shows diagrams of a serialization graph that prevents four cycles and corresponding execution timelines, according to an embodiment.

Serialization can also support arbitrary input histories. FIG. 11 shows diagrams 1101, 1102, 1103 of a serialization graph 1101 that prevents four cycles and corresponding execution timelines 1102, 1103, according to an embodiment. Diagram 1101 shows a serialization graph that prevents Bi' and Dj' from causing cycles in serialization graph. Diagram 1102 shows an execution timeline in which there is no cycle when reordering execution of Bi'[y]. There is no cycle is Ck[v] is executed before Bi'[y] and if Ck[z], Dj[z], and Dj'[z] are each executed before Bi'[y]. Diagram 1103 shows an execution timeline in which there is no cycle when reordering execution of Dj'[z] in which there is no cycle if Ck[z] is executed before Dj'[z] and if Ck[y], Bi[y], and Bi'[y] are each executed before Dj'[z].

Figure 12:
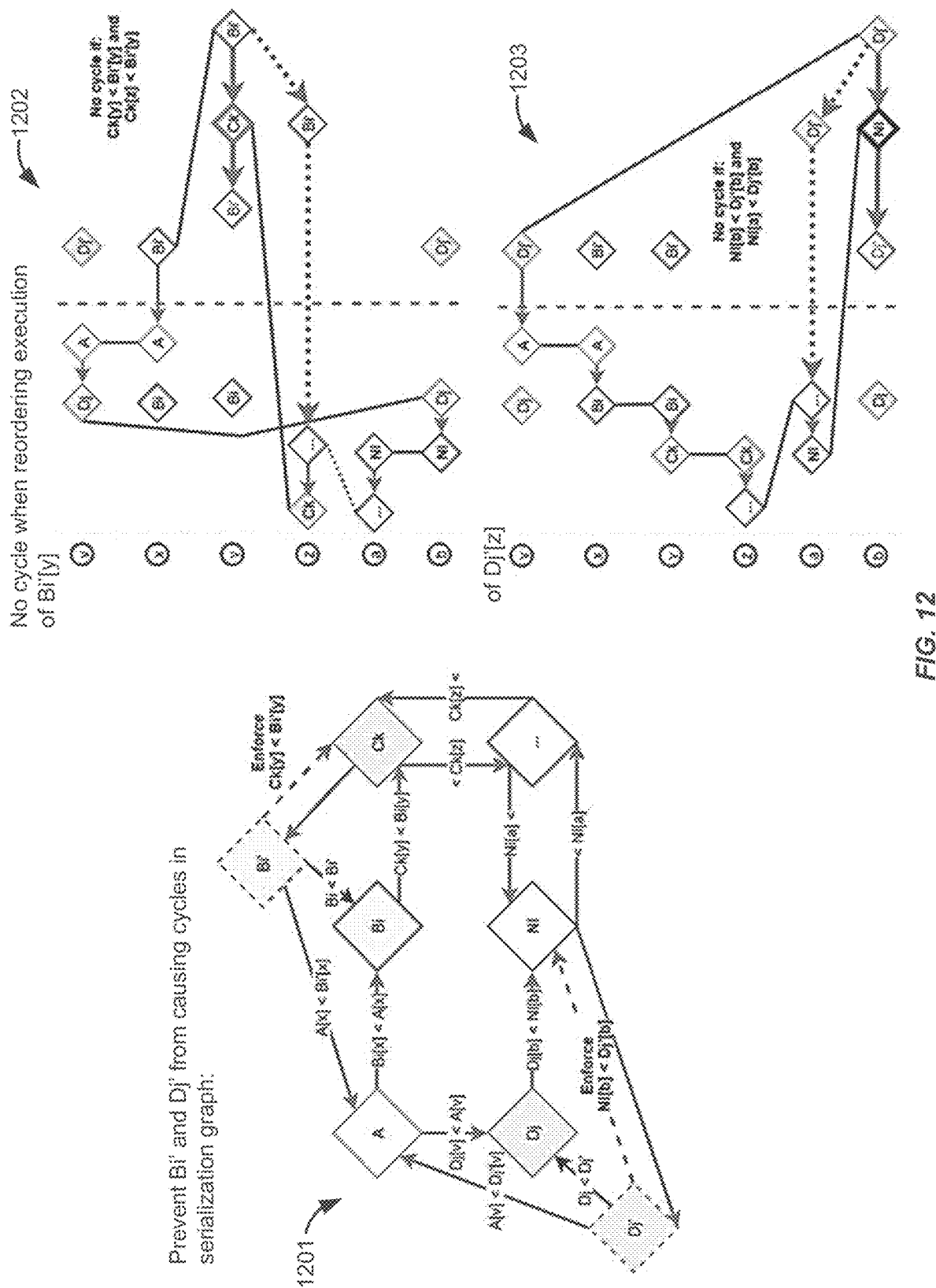
FIG. 12 shows diagrams of a serialization graph that prevents n cycles and corresponding execution timelines, according to an embodiment.

Another approach to support arbitrary inputs histories for n cycles is now described. FIG. 12 shows diagrams 1201, 1202, 1203 of a serialization graph 1201 that prevents cycles and corresponding execution timelines 1202, 1203, according to an embodiment. Diagram 1201 shows a serialization graph that prevents Bi' and Dj' from causing cycles. This graph enforces execution of Ck[y] before Bi'[y] and enforces execution of NI[b] before Dj'[b]. Diagram 1202 shows an execution timeline in which there is no cycle when reordering execution of Bi'[y]. That is, there is no cycle if Ck[y] is executed before Bi'[y] and if Ck[z] is executed before Bi'[y]. Diagram 1203 shows an execution timeline in which there is no cycle when reordering execution of Dj'[z]. That is, there is no cycle if NI[b] is executed before Dj'[b] and NI[a] is executed before Dj'[b].

As discussed above, execution of transactions may be ordered in order to prevent cycles. Ordering of transaction execution may be achieved using "epochs." Epochs describe a period of time between "breaking transaction types." This epoch-based streaming concurrency control determines when a cycle in the serialization graph if imminent and orders the transactions in order to prevent the cycle.

Figure 13:
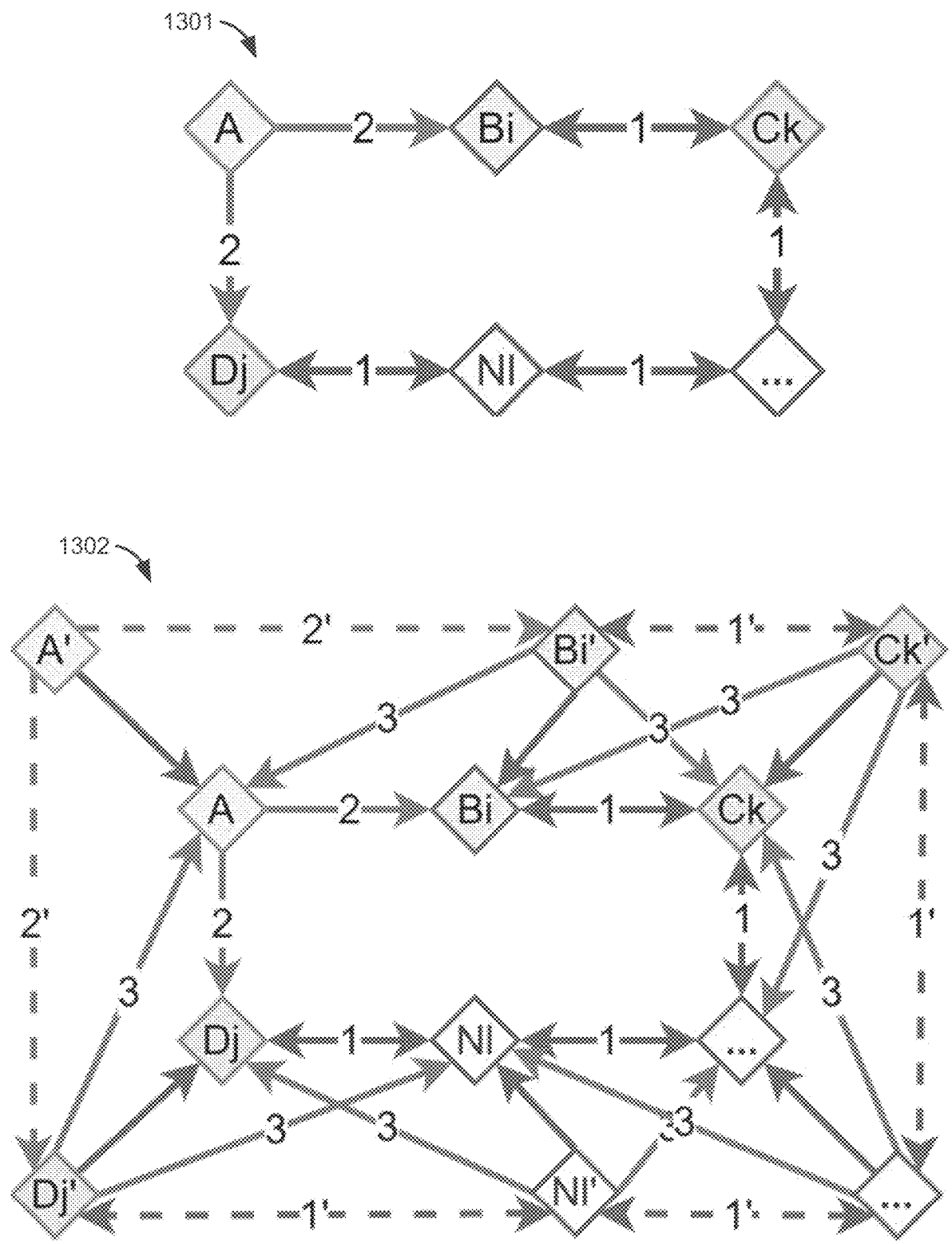
FIG. 13 shows diagrams of an analysis of histories of transactions, according to an embodiment.

FIG. 13 shows diagrams 1301, 1302 of an analysis of histories of transactions, according to an embodiment. Diagram 1301 shows analysis of histories of transactions of static cycle as long as transactions of one transaction type (e.g., type A) are not scheduled such that the serialization graph (e.g., history) is acyclic. Ordering a transaction "A" after every scheduled transaction of its conflicting transaction types (i.e., type B and type D) keeps the serialization graph (e.g., the history with A) acyclic. Diagram 1301 shows epoch "1" and epoch "2" dividing the transaction execution timeline into before and after execution of transaction A: transaction A is executed after after Bi and after Dj (the arrows point away from A) ensuring that there is no cycle since (there are no arrows pointing from Bi or Dj to A). That, transactions Bi, Ck, Dj, NI, etc. can all be executed in epoch 1 but when transaction A is to be executed the transaction in epoch 1 must be executed before transaction A and then after transaction A is executed the other types of transactions may be executed in epoch 2, until another transaction of type A is to be executed. When another transaction of type A is executed the same before/after requirement is imposed: transactions in the current epoch are executed before transaction A and any other types of transactions received later are executed in the next epoch. Thus, transaction A is referred to as a "breaking transaction type" as this before/after execution requirement based on epochs can break cycles, thereby ensuring proper serial execution.

Diagram 1302 shows further analysis of serialization graph of transactions (e.g., histories of transactions) of statis cycles. In this example analysis: (1) as long as a transaction of one type (e.g., type A) is not scheduled, the serialization graph is acyclic; (2) ordering a transaction A after every scheduled transaction of its conflicting transaction types (e.g., B and S) keeps the serialization graph (history with A) acyclic; and (3) ordering subsequent transactions (e.g., Bi' and Ck') after already schedule transactions of conflicting transaction types keeps the serialization graph acyclic after transaction A is appears (e.g., is requested or initiated), as overtaking earlier transactions would cause a cycle. This analysis may be recursive and begin at (1) again.

A transaction scheduler for transactions of type A can inform the transaction schedulers for the other types of transactions that an epoch change will happen. The transaction scheduler for a particular type of transaction may be implemented by an execution component and may receive a request for a transaction and issue corresponding events to other execution components to execute the transaction.

The epoch-notification communication discussed above may be one-way (e.g., no back and forth is communication required). Given this one-way communication, the concurrency control protocol using on epochs as described herein is advantageous in that it ensures proper serialization more efficiently than prior concurrency control protocols, such as two-phase locking or other "ownership" protocols, which require additional communication to transfer ownership.

Serialization of arbitrary inputs may be performed using the following protocol. This protocol schedules safe transactions in the current epoch. However, scheduling a breaking transaction type separates transactions into prior and next epoch such that in the serialization graph all conflict edges point from transactions of next epoch to transactions of prior epoch, keeping the serialization graph acyclic.

The protocol for serialization of arbitrary input histories is as follows:
(1) Safe transaction types are schedule in the current epoch until a breaking transaction type is scheduled.
(2) The breaking transaction type is scheduled as the last transaction of the current epoch and it triggers transition to the next epoch.
(3) The transition between epochs involves: scheduling new transaction in the next epoch, executing all attribute accesses of the current epoch, and the accesses of the breaking transaction type are executed last in the current epoch (e.g., the breaking transaction type is executed after the safe transaction type).

The protocol for serialization of arbitrary input histories may be implemented by the transaction schedulers of breaking transaction types and safe transaction types which initiate the transactions. These schedulers may be implemented by execution components as discussed above. The processors (execution components) may execute all operations accessing a specific attribute regardless of the type of transaction (breaking type or safe type).

Scheduling a transaction involves the following: registered transaction types (e.g., registered by a user of the database system) define order of accesses to attributes as a directed acyclic graph (DAG). Transactions of given type are scheduled by initially sending requests to processors hosting the attributes of the roots of the DAG of the given transaction type and then these processors send the further requests. When a breaking type of transaction is scheduled, the epoch is advanced at all transactions schedulers, which schedule tombstone transactions marking the last transaction of a given type. The tombstone transactions are scheduled according to the DAG of a given transaction type (e.g., as are normal transactions), but access all partitions of an attribute, such that end of epoch propagates to all relevant processors.

When the processor receives request of tombstone transaction it buffers all further requests of the according transaction type until current epoch is drained for all transaction types (i.e., receiving requests of tombstone transactions from all transaction types), then it sends the next requests of this tombstone transaction, as per protocol (3), to all processors operating partitions of the next attributes Further implementation details are now provided. Implementations of serialization of arbitrary input histories (e.g., serialization graphs) may include a "breaking transaction type" (e.g., transaction A in the example above) that is configured to trigger the next epoch by sending a multi-cast message indicating the next epoch to its peer "safe transaction type" transaction schedulers. Breaking transaction types are types of transactions that may be scheduled between epochs. The epochs are periods of time during which safe transaction types may be executed. The safe transaction types are types of transactions that may be executed in parallel without a cycle whereas the breaking transaction types are types of transactions that would create a cycle if executed in parallel with other transactions. The safe transaction types may be executed in any order during an epoch and then when a breaking type of transaction is to be executed, it is scheduled after all transactions have been executed in the current epoch and later transactions are scheduled after the breaking transaction type in the following epoch.

Implementation of serialization may use "tombstone" transactions for each of the transaction types. When the breaking transaction scheduler (implemented by an execution component) informs the other transaction schedulers (implemented by other execution components) of the new epoch, the other safe transaction type schedulers may issue a "tombstone" transaction of their corresponding transaction type. The tombstone transaction marks the last transaction of that particular type that will be executed in the current epoch. After the tombstone transaction is scheduled, the safe transaction type schedulers only schedule transactions for the next epoch. The scheduler may be able to continuously schedule transactions to execute in a particular epoch with respect to the tombstone transaction.

The tombstone transaction enables serialization as the transactions that are dispatched to execution components will execute operations in some order on some tables, and the execution components must know when the next epoch happens while continuously executing transactions. In order to provide execution in the correct order, the transactions are tagged with the epoch that they are to be executed in. The tombstone transaction is ordered after all events of the current epoch such that when an execution component processes a tombstone transaction, it knows that it can begin to execute events of the next epoch and it knows that no events of the previous epoch will arrive. When the tombstone transaction is processed by the execution component, it collects the tombstones of all other safe transaction types. When the tombstones for all sage transaction types have been received, the execution component knows that no other transactions are outstanding in the current epoch. The execution component executing events for a particular table knows the overall number of registered or stored transaction types and so it can determine the number of tombstones that need to be collected. The tombstone collection process is decentralized and every execution component performs tombstone collection on its own. The tombstone transaction of a particular type may be considered a "dummy" transaction of that type in that it is scheduled an initiated by the scheduler for that type, and it flows through the execution components like any other transaction of that type. However, tables are not accessed based on the tombstone transaction.

The concurrency control protocol described above is advantageous in that it uses topologies of transactions to generate serialization graphs which are used to identify types of transactions that are breaking types which can be scheduled between epochs in which non-breaking (safe) types of transactions are executed such that cycles are prevented, thereby achieving proper serialization of the transactions. Another advantage of the protocol is that the use of epochs and tombstone transactions requires less communication compared to prior concurrency control protocols that rely on "ownership" or "locking."

Figure 14:
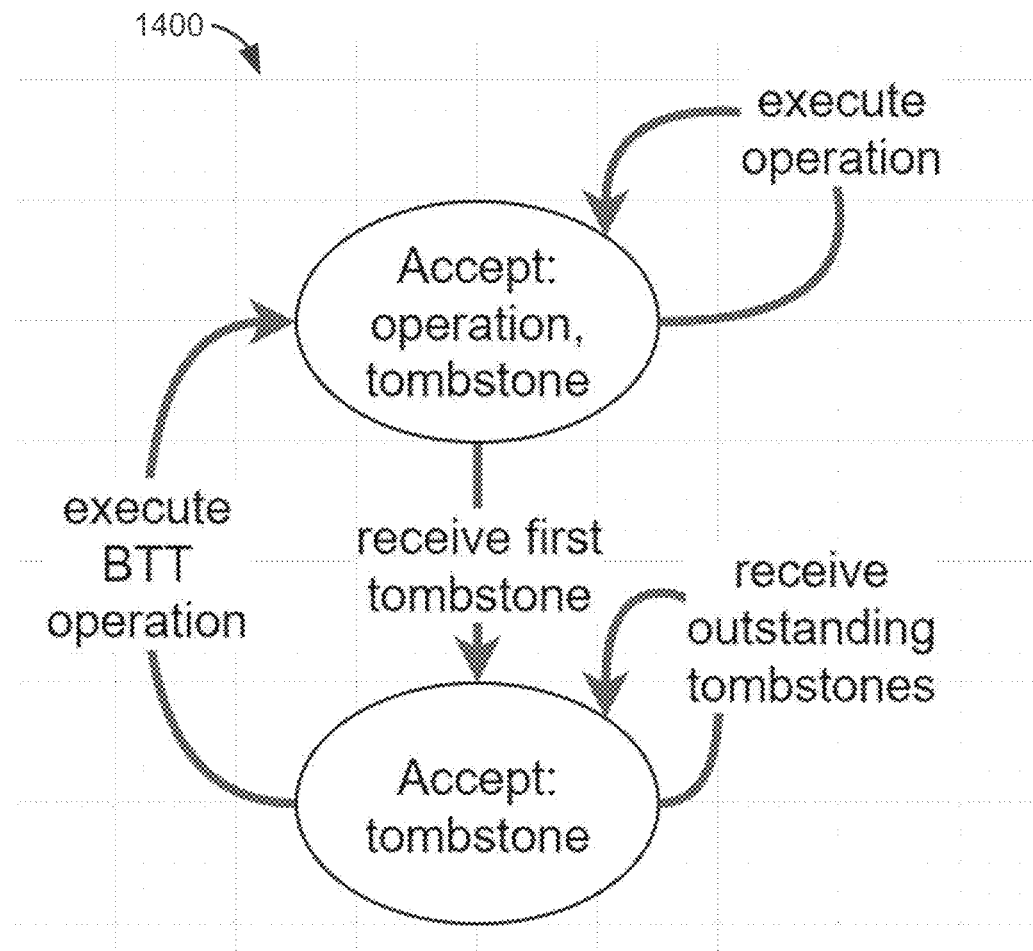
FIG. 14 shows a diagram of a concurrency control protocol implemented as a state machine, according to an embodiment.

FIG. 14 shows a diagram 1400 of a concurrency control protocol implemented as a state machine, according to an embodiment. This state machine describes transaction processing according to the concurrency control protocol described above. The protocol includes the following breaking transaction type initiator logic on request: (1) dispatch transaction and tombstone with the current epoch; (2) increment the epoch; (3) multi-cast next epoch to safe transaction type initiators. The protocol includes the following safe transaction type initiator logic on request: dispatch transaction with the current epoch. The protocol includes the following safe transaction type initiator logic on the next epoch: (1) dispatch tombstone with current epoch; (2) take next epoch.

The processor logic assumes that events of same transaction type arrive in order.

The logic on a request is:
if in current epoch: execute (requests of some transaction type may still arrive, when tombstone of other transaction type was received);
Else (next epoch): do not consume (buffer).
The logic on a tombstone is:
if tombstone of next epoch: do not consume (buffer)
If in current epoch: decrement outstanding tombstones
If BTT tombstone: defer op until end of trans.
If no outstanding tombstones: end trans.
The logic on an end transition is:
Execute deferred BTT op
Continue with not consumed messages
The logic on buffering is:
(1) Either physically partition event streams by transaction type, then simply not consume (is simpler and suits stateless design and FPGAs)
(2) Or use secondary buffer, then copy and replay (buffer per partition or even single buffer)

Option 1 is simpler for execution and follows streaming idea and suits FPGAs. Option 2 is simpler for communication.

Example Hardware

Figure 15:
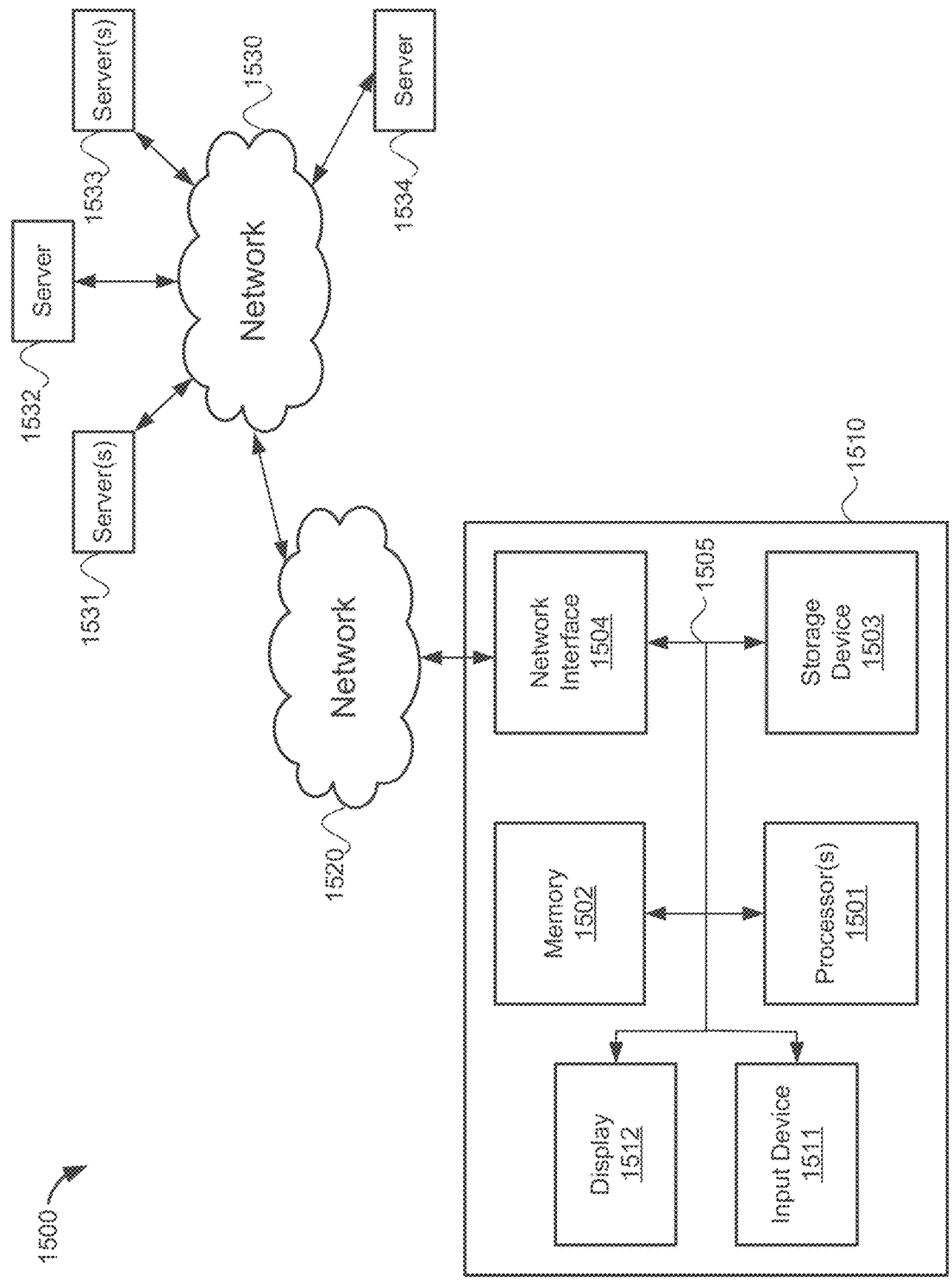
FIG. 15 shows a diagram of hardware of a special purpose computing machine for implementing systems and methods described herein.

FIG. 15 shows a diagram 1500 of hardware of a special purpose computing machine for implementing systems and methods described herein. The following hardware description is merely one example. It is to be understood that a variety of computers topologies may be used to implement the above described techniques. The hardware shown in FIG. 15 may be used to implement the computer systems and computer software (computer reprogram code) described herein.

The computer system 1510 includes a bus 1505 or other communication mechanism for communicating information, and one or more processor(s) 1501 coupled with bus 1505 for processing information. The computer system 1510 also includes a memory 1502 coupled to bus 1505 for storing information and instructions to be executed by processor 1501, including information and instructions for performing some of the techniques described above, for example. This memory may also be used for storing programs executed by processor(s) 1501. Possible implementations of this memory may be, but are not limited to, random access memory (RAM), read only memory (ROM), or both. A storage device 1503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1503 may include source code, binary code, or software files for performing the techniques above, for example. Storage device and memory are both examples of non-transitory computer readable storage mediums.

The computer system 1510 may be coupled via bus 1505 to a display 1512 for displaying information to a computer user. An input device 1511 such as a keyboard, touchscreen, and/or mouse is coupled to bus 1505 for communicating information and command selections from the user to processor 1501. The combination of these components allows the user to communicate with the system. In some systems, bus 1505 represents multiple specialized buses, for example.

The computer system also includes a network interface 1504 coupled with bus 1505. The network interface 1504 may provide two-way data communication between computer system 1510 and a network 1520. The network interface 1504 may be a wireless or wired connection, for example. The network 1520 may be a local area network or an intranet, for example. The computer system 1510 can send and receive information through the network interface 1504, across the network 1520, to computer systems connected to the Internet 1530. Using the Internet 1530 the computer system 1510 may access data and features that reside on multiple different hardware servers 1531-1534. The servers 1531-1534 may be part of a cloud computing environment in some embodiments.

Example Embodiments

Various example embodiments implementing the techniques discussed above are described below.

1. A computer system, comprising: one or more processors; one or more machine-readable medium coupled to the one or more processors and storing computer program code comprising sets instructions executable by the one or more processors to: determine a plurality of types of transactions executable on a database, each type of transaction including a corresponding set of one or more queries accessing particular tables of the database; determine a transaction topology for each type of transaction in the plurality of types, the transaction topology for a particular type of transaction including one or more nodes representing particular tables of the database accessed by that particular type of transaction and directed edges between the one or more nodes indicating data dependencies for that particular type of transaction; combine the transaction topologies for each type of transaction into a combined topology; generate a serialization graph representing the combined topology, the serialization graph including one or more nodes representing types of transactions and directed edges between the nodes indicating a before/after order of accessing a particular table of the database by the transactions; identify one or more cycles in the serialization graph based on a determination that a set of directed edge starting from a particular node points back to that particular node to form a cycle; determine a breaking transaction type for each of the one or more cycles, a corresponding breaking transaction type for a particular cycle breaking the particular cycle when the corresponding breaking transaction type is a last executed transaction in a current epoch; receive requests to execute a stream of transactions on a database, each transaction in the stream of transaction having a corresponding type that is one of the plurality of types of transactions; and execute the stream of transactions by scheduling execution of transactions that do not have the breaking transaction type in the current epoch, scheduling a transaction having the breaking transaction type as a last transaction in the current epoch, and scheduling later transaction not having the breaking transaction type in a next epoch, the transaction having the breaking transaction type being executed after every transaction scheduled in the current epoch and being executed before every transaction scheduled in the next epoch.

2. The computer system of 1, wherein the scheduling of the transaction having the breaking transaction type includes scheduling tombstone transactions for each of the plurality of types of transactions, wherein transactions scheduled after the tombstone transaction are scheduled for the next epoch and are not executed until the tombstone transactions for each of the plurality of types of transactions have been executed.

3. The computer system of 1, wherein the scheduling of the transaction having the breaking transaction type includes sending a multi-cast message indicating the next epoch to transaction schedulers for transactions that do not have the breaking transaction type.

4. The computer system of 1, wherein the scheduling of the execution of the transactions that do not have the breaking transaction type includes tagging the transactions with a tag indicating a transaction execution epoch for executing that transaction.

5. The computer system of 1, wherein each of the one or more cycles indicates a serialization violation in which an earlier transaction accesses a particular table after a later transaction.

6. The computer system of 1, wherein the data dependencies indicated by the transaction topologies are determined based on an ordering of database statements and intermediate results between the database statements.

7. The computer system of 1, wherein the scheduling of each type of transaction is performed by a separate execution component, and wherein particular table of the database is accessed using a different set of execution components.

8. One or more non-transitory computer-readable medium storing computer program code comprising sets of instructions to: determine a plurality of types of transactions executable on a database, each type of transaction including a corresponding set of one or more queries accessing particular tables of the database; determine a transaction topology for each type of transaction in the plurality of types, the transaction topology for a particular type of transaction including one or more nodes representing particular tables of the database accessed by that particular type of transaction and directed edges between the one or more nodes indicating data dependencies for that particular type of transaction; combine the transaction topologies for each type of transaction into a combined topology; generate a serialization graph representing the combined topology, the serialization graph including one or more nodes representing types of transactions and directed edges between the nodes indicating a before/after order of accessing a particular table of the database by the transactions; identify one or more cycles in the serialization graph based on a determination that a set of directed edge starting from a particular node points back to that particular node to form a cycle; determine a breaking transaction type for each of the one or more cycles, a corresponding breaking transaction type for a particular cycle breaking the particular cycle when the corresponding breaking transaction type is a last executed transaction in a current epoch; receive requests to execute a stream of transactions on a database, each transaction in the stream of transaction having a corresponding type that is one of the plurality of types of transactions; and execute the stream of transactions by scheduling execution of transactions that do not have the breaking transaction type in a current epoch, scheduling a transaction having the breaking transaction type as a last transaction in the current epoch, and scheduling later transaction not having the breaking transaction type in a next epoch, the transaction having the breaking transaction type being executed after every transaction scheduled in the current epoch and being executed before every transaction scheduled in the next epoch.

9. The non-transitory computer-readable medium of 8, wherein the scheduling of the transaction having the breaking transaction type includes scheduling tombstone transactions for each of the plurality of types of transactions, wherein transactions scheduled after the tombstone transaction are scheduled for the next epoch and are not executed until the tombstone transactions for each of the plurality of types of transactions have been executed.

10. The non-transitory computer-readable medium of 8, wherein the scheduling of the transaction having the breaking transaction type includes sending a multi-cast message indicating the next epoch to transaction schedulers for transactions that do not have the breaking transaction type.

11. The non-transitory computer-readable medium of 8, wherein the scheduling of the execution of the transactions that do not have the breaking transaction type includes tagging the transactions with a tag indicating a transaction execution epoch for executing that transaction.

12. The non-transitory computer-readable medium of 8, wherein each of the one or more cycles indicates a serialization violation in which an earlier transaction accesses a particular table after a later transaction.

13. The non-transitory computer-readable medium of 8, wherein the data dependencies indicated by the transaction topologies are determined based on an ordering of database statements and intermediate results between the database statements.

14. The non-transitory computer-readable medium of 8, wherein the scheduling of each type of transaction is performed by a separate execution component, and wherein particular table of the database is accessed using a different set of execution components.

15. A computer-implemented method, comprising: determining a plurality of types of transactions executable on a database, each type of transaction including a corresponding set of one or more queries accessing particular tables of the database; determining a transaction topology for each type of transaction in the plurality of types, the transaction topology for a particular type of transaction including one or more nodes representing particular tables of the database accessed by that particular type of transaction and directed edges between the one or more nodes indicating data dependencies for that particular type of transaction; combining the transaction topologies for each type of transaction into a combined topology; generating a serialization graph representing the combined topology, the serialization graph including one or more nodes representing types of transactions and directed edges between the nodes indicating a before/after order of accessing a particular table of the database by the transactions; identifying one or more cycles in the serialization graph based on a determination that a set of directed edge starting from a particular node points back to that particular node to form a cycle; determining a breaking transaction type for each of the one or more cycles, a corresponding breaking transaction type for a particular cycle breaking the particular cycle when the corresponding breaking transaction type is a last executed transaction in a current epoch; receiving requests to execute a stream of transactions on a database, each transaction in the stream of transaction having a corresponding type that is one of the plurality of types of transactions; and executing the stream of transactions by scheduling execution of transactions that do not have the breaking transaction type in a current epoch, scheduling a transaction having the breaking transaction type as a last transaction in the current epoch, and scheduling later transaction not having the breaking transaction type in a next epoch, the transaction having the breaking transaction type being executed after every transaction scheduled in the current epoch and being executed before every transaction scheduled in the next epoch.

16. The computer-implemented method of 15, wherein the scheduling of the transaction having the breaking transaction type includes scheduling tombstone transactions for each of the plurality of types of transactions, wherein transactions scheduled after the tombstone transaction are scheduled for the next epoch and are not executed until the tombstone transactions for each of the plurality of types of transactions have been executed.

17. The computer-implemented method of 15, wherein the scheduling of the transaction having the breaking transaction type includes sending a multi-cast message indicating the next epoch to transaction schedulers for transactions that do not have the breaking transaction type.

18. The computer-implemented method of 15, wherein the scheduling of the execution of the transactions that do not have the breaking transaction type includes tagging the transactions with a tag indicating a transaction execution epoch for executing that transaction.

19. The computer-implemented method of 15, wherein each of the one or more cycles indicates a serialization violation in which an earlier transaction accesses a particular table after a later transaction.

20. The computer-implemented method of 15, wherein the data dependencies indicated by the transaction topologies are determined based on an ordering of database statements and intermediate results between the database statements.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A method comprising:
receiving an input comprising type information for a first transaction type and a second transaction type executable on a database, wherein the database comprises a plurality of job components, the plurality of job components configured to form an architecture of the database for executing transactions in parallel;
storing the type information on the database;
receiving a stream of transactions to execute on the database according to an order, wherein the stream of transactions comprises a first transaction of the first transaction type and a second transaction of the second transaction type, wherein the first transaction and the second transaction access at least one table in common in the database, and wherein the order indicates that the first transaction accesses the at least one table in common before the second transaction;
determining that a parallel execution of the first transaction and the second transaction results in a conflict for the at least one table in common; and
in response to the determining the conflict:
performing a first update of the architecture to produce a first updated architecture to execute the first transaction by configuring the plurality of job components based on the first transaction;
executing the first transaction according to the first updated architecture;
in response to completing execution of the first transaction, performing a second update of the first updated architecture to produce a second updated architecture to execute the second transaction by configuring the plurality of job components based on the second transaction; and
executing the second transaction according to the updated architecture.

2. The method as in claim 1, wherein each job component of the plurality of job components is configurable as a query optimizer to output a stream of events to other job components or a worker to output result data based on input events and table data.

3. The method as in claim 2, wherein configuring the plurality of job components based on the first transaction comprises routing the stream of events through the plurality of job components according to a first flow for the stream of events, and wherein configuring the plurality of job components based on the second transaction comprises routing the stream of events through the plurality of job components according to a second flow for the stream of events that is different from the first flow.

4. The method as in claim 1, wherein changing the architecture comprises:
generating a stream of events based on the stream of transactions, wherein at least one job component of the plurality of job components is configured by an event of the stream of events to receive the stream of events and output a stream of database operations in response to receiving the stream of events; and
dispatching, by the at least one job component, the stream of database operations to the database and remaining job components of the plurality of job components such that the database provides table data to the remaining job components and the remaining job components output result data based on the stream of database operations and the table data.

5. The method as in claim 4, wherein dispatching the stream of database operations comprises associating each job component in a first portion of the remaining job components with a particular table of the database such that each job component in the first portion performs one database operation on the table data for the particular table.

6. The method of claim 4, wherein modifying the configuration of the plurality of job components further comprises adding a new component to the plurality of job components, wherein the new component is configured to receive all database operations that access the at least one table in common between the first transaction and the second transaction to track which database operation is received first, and wherein the new component dispatches events to the remaining job components based on the database operation that is received first.

7. The method as in claim 1, further comprising generating a graph to represent the parallel execution of the first transaction and the second transaction based on the type information stored in the database, wherein said determining the conflict is based on the graph.

8. The method as in claim 7, wherein said determining the conflict comprises:
generating a serialization graph based on the graph, the serialization graph indicating each permutation of before-and-after database access of the at least one table in common by the first transaction and the second transaction; and
identifying that the serialization graph comprises at least one cycle.

9. The method as in claim 7, wherein the input comprises a plurality of transaction specific parameters, wherein transactions of the stream of transactions are associated with computer programming code comprising database access instructions for the transactions, and wherein generating the graph comprises:
analyzing the computer programming code associated with the first transaction to determine that the first transaction is of the first transaction type;

generating a first topology for the first transaction, the first topology having a first structure comprising a first set of nodes, wherein the first structure is based on the type information stored in the database and the first set of nodes represents the plurality of transaction specific parameters corresponding to the first transaction;
analyzing the computer programming code associated with the second transaction to determine that the second transaction is of the second transaction type;
generating a second topology for the second transaction, the second topology having a second structure comprising a second set of nodes, wherein the second structure is based on the type information stored in the database and the second set of nodes represents the plurality of transaction specific parameters corresponding to the second transaction; and
combining the first topology and the second topology such that the first set of nodes and the second set of nodes overlap corresponding to the plurality of transaction specific parameters indicating that both the first transaction and the second transaction access the at least one table in common.

10. A non-transitory computer readable storage medium embodying a computer program for performing a method, the method comprising:
receiving an input comprising type information for a first transaction type and a second transaction type executable on a database, wherein the database comprises a plurality of job components, the plurality of job components configured to form an architecture of the database for executing transactions in parallel;
storing the type information on the database;
receiving a stream of transactions to execute on the database according to an order, wherein the stream of transactions comprises a first transaction of the first transaction type and a second transaction of the second transaction type, wherein the first transaction and the second transaction access at least one table in common in the database, wherein the order indicates that the first transaction accesses the at least one table in common before the second transaction;
determining that a parallel execution of the first transaction and the second transaction results in a conflict for the at least one table in common;
in response to the determining the conflict:
performing a first update of the architecture to produce a first updated architecture to execute the first transaction by configuring the plurality of job components based on the first transaction;
executing the first transaction according to the first updated architecture;
in response to completing execution of the first transaction, performing a second update of the first updated architecture to produce a second updated architecture to execute the second transaction by configuring the plurality of job components based on the second transaction; and
executing the second transaction according to the updated architecture.

11. The non-transitory computer readable storage medium as in claim 10, wherein each job component of the plurality of job components is configurable as a query optimizer to output a stream of events to other job components or a worker to output result data based on input events and table data.

12. The non-transitory computer readable storage medium as in claim 10, wherein each job component of the plurality of job components is configurable as either a query optimizer to output a stream of events to other job components or a worker to output result data based on input events and table data, and wherein the worker can be one of a database join operator or a database scan operator.

13. The non-transitory computer readable storage medium as in claim 10, wherein changing the architecture comprises:
generating a stream of events based on the stream of transactions, wherein at least one job component of the plurality of job components is configured by an event of the stream of events to receive the stream of events and output a stream of database operations in response to receiving the stream of events; and
dispatching, by the at least one job component, the stream of database operations to the database and remaining job components of the plurality of job components such that the database provides table data to the remaining job components and the remaining job components output result data based on the stream of database operations and the table data.

14. The non-transitory computer readable storage medium as in claim 13, wherein dispatching the stream of database operations comprises associating each job component in a first portion of the remaining job components with a particular table of the database such that each job component in the first portion performs one database operation on the table data for the particular table.

15. The non-transitory computer readable storage medium as in claim 13, wherein modifying the configuration of the plurality of job components further comprises adding a new component to the plurality of job components, wherein the new component is configured to receive all database operations that access the at least one table in common between the first transaction and the second transaction to track which database operation is received first, and wherein the new component dispatches events to the remaining job components based on the database operation that is received first.

16. A computer system comprising:
one or more processors;
a software program, executable on the computer system, the software program configured to cause an engine to:
receive an input comprising type information for a first transaction type and a second transaction type executable on a database, wherein the database comprises a plurality of job components, the plurality of job components configured to form an architecture of the database for executing transactions in parallel;
store the type information on the database;
receive a stream of transactions to execute on the database according to an order, wherein the stream of transactions comprises a first transaction of the first transaction type and a second transaction of the second transaction type, wherein the first transaction and the second transaction access at least one table in common in the database, wherein the order indicates that the first transaction accesses the at least one table in common before the second transaction;
determine that a parallel execution of the first transaction and the second transaction results in a conflict for the at least one table in common;
in response to the determining the conflict:
perform a first update of the architecture to produce a first updated architecture to execute the first transaction by configuring the plurality of job components based on the first transaction;
execute the first transaction according to the first updated architecture;
in response to completing execution of the first transaction, perform a second update of the first updated architecture to produce a second updated architecture to execute the second transaction by configuring the plurality of job components based on the second transaction; and
execute the second transaction according to the updated architecture.

17. The computer system as in claim 16, wherein each job component of the plurality of job components is configurable as either a query optimizer to output a stream of events to other job components or a worker to output result data based on input events and table data, wherein the worker can be one of a database join operator or a database scan operator.

18. The computer system as in claim 16, wherein changing the architecture comprises:
generating a stream of events based on the stream of transactions, wherein at least one job component of the plurality of job components is configured by an event of the stream of events to receive the stream of events and output a stream of database operations in response to receiving the stream of events; and
dispatching, by the at least one job component, the stream of database operations to the database and remaining job components of the plurality of job components such that the database provides table data to the remaining job components and the remaining job components output result data based on the stream of database operations and the table data.

19. The computer system as in claim 18, wherein dispatching the stream of database operations comprises associating each job component in a first portion of the remaining job components with a particular table of the database such that each job component in the first portion performs one database operation on the table data for the particular table.

20. The computer system as in claim 18, wherein modifying the configuration of the plurality of job components further comprises adding a new component to the plurality of job components, wherein the new component is configured to receive all database operations that access the at least one table in common between the first transaction and the second transaction to track which database operation is received first, and wherein the new component dispatches events to the remaining job components based on the database operation that is received first.

* * * * *